United States Patent
Yousefi et al.

(10) Patent No.: US 11,462,828 B1
(45) Date of Patent: Oct. 4, 2022

(54) PERIPHERAL ANTENNA PLACEMENT FOR CALIBRATION FOR A PHASED ARRAY ANTENNA

(71) Applicant: Amazon Technologies, Inc., Seattle, WA (US)

(72) Inventors: Tara Yousefi, Sammamish, WA (US); Iyappan Ramachandran, Sammamish, WA (US); Murat Veysoglu, Kirkland, WA (US); Peter James Hetzel, Seattle, WA (US); Billy Pingli Kao, Bothell, WA (US); Alireza Mahanfar, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 17/097,518

(22) Filed: Nov. 13, 2020

(51) Int. Cl.
| | |
|---|---|
| H04B 1/06 | (2006.01) |
| H01Q 3/36 | (2006.01) |
| H01Q 9/04 | (2006.01) |
| H01Q 1/28 | (2006.01) |
| H04B 1/16 | (2006.01) |
| H01Q 13/02 | (2006.01) |

(52) U.S. Cl.
CPC ............. *H01Q 3/36* (2013.01); *H01Q 1/288* (2013.01); *H01Q 9/0407* (2013.01); *H01Q 13/0275* (2013.01); *H04B 1/1607* (2013.01)

(58) Field of Classification Search
CPC ...... H01Q 1/285; H01Q 1/288; H01Q 9/0407; H01Q 13/02; H01Q 13/0275; H04B 1/1607
See application file for complete search history.

(56) References Cited

U.S. PATENT DOCUMENTS

| | | | | | |
|---|---|---|---|---|---|
| 10,790,592 | B2 * | 9/2020 | You | ........................... | H01P 5/12 |
| 10,840,583 | B2 * | 11/2020 | Lee | ......................... | H01Q 21/28 |
| 10,847,897 | B2 * | 11/2020 | Almog | ..................... | H01Q 9/44 |
| 11,081,787 | B2 * | 8/2021 | Luna | ...................... | H01Q 1/002 |

\* cited by examiner

*Primary Examiner* — Nhan T Le
(74) *Attorney, Agent, or Firm* — Lowenstein Sandler LLP

(57) ABSTRACT

Technologies directed to a directional calibration antenna for calibration of an array antenna of a communication system are described. The communication system includes the array antenna which includes a number of antenna elements. The number of antenna elements are located in an area on a first side of a support structure. A directional antenna is located at a first height above a plane of the array antenna and at a periphery of the area. The directional antenna is pointed towards the array antenna and is located within a near field of the array antenna.

20 Claims, 20 Drawing Sheets

PERIPHERAL ANTENNA PLACEMENT FOR CALIBRATION FOR A PHASED ARRAY ANTENNA

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
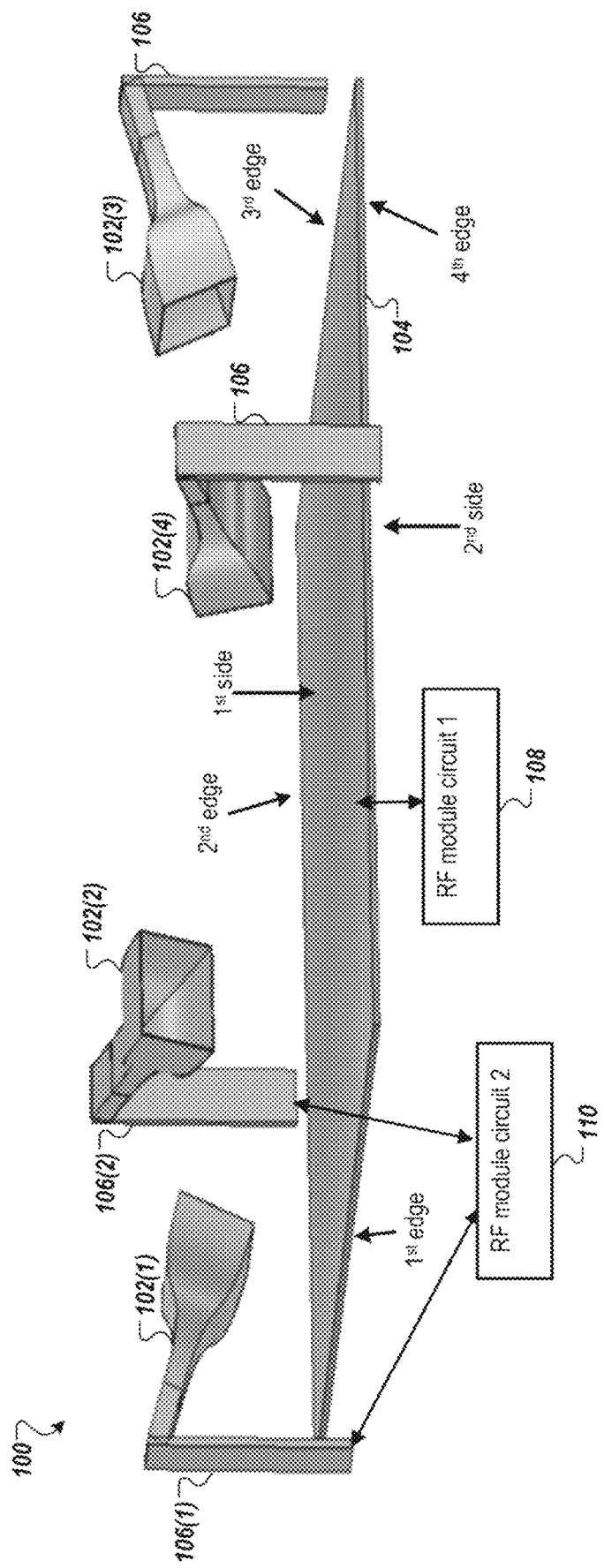
FIG. 1 illustrates an array antenna of a communication system with directional antennas located around a periphery of the array antenna according to one embodiment.

Technologies directed to calibration antennas located on a periphery of an antenna array for calibrating a phased array antenna are described. Described herein are calibration antennas that are located on a periphery of an antenna module of a phased array antenna. An array antenna, such as a phased array antenna, can be constructed of a number of antenna modules (also referred to simply as modules) that each include an integer number of antenna elements. The antenna modules can be manufactured from a ceramic-based material, a Teflon-based material, organic materials, or the like. The antenna elements can be printed on the modules (e.g., using copper). The antenna elements can be printed on the antenna modules in such a way to minimize the space between an edge of the antenna module and one of the antenna elements near the edge. In this way, the antenna elements can be spaced closer together when the antenna modules are assembled together, and the grating lobes can be minimized.

The antenna elements form an antenna array of the phased array antenna which operates to form beams (e.g., of electromagnetic radiation) and to steer the beams by relying on constructive and destructive interference of electromagnetic waves transmitted by each individual antenna element. An important part in the design and performance of a phased array antenna is the ability to periodically calibrate the phased array antenna and maintain it in a calibrated state while it is in orbit. There are a number of factors that can cause a phased array antenna to become un-calibrated and to have a degradation of performance. In some cases, a phased array antenna is airborne and/or satellite-borne and can contain a large number of elements and a ground-based calibration may not be a practical means of calibration. In such cases an in-orbit calibration solution should be implemented.

In-orbit techniques for calibration can utilize one or more calibration antennas to gather data (such as phase and amplitude data) from the antenna elements of the phased array antenna. The data can be compared to initial data that was obtained and stored as reference data (also referred to as a golden reference or a golden standard) before the phased array antenna is launched and deployed in orbit. The reference data is obtained after an initial in-factory calibration and after ensuring a correct performance of the antenna array. Once the array antenna is initially calibrated, the calibration antennas can be used to couple to the antenna elements to gather the reference data, which is stored. The calibration antennas can be a part of the array of antenna elements or can be separate from the array of antenna elements. When the calibration antennas are part of the antenna array, they can lead to defects or irregularities in the uniformity of the array pattern, which can cause performance degradation, for example by increasing grating side lobes of a radiation pattern of the phased array antenna. Additionally, including the calibration antennas as part of the antenna array can increase complexity and manufacturing costs, as well as place design constraints on the calibration antennas which must be small enough to fit in available space in the antenna array and be capable of operating in the appropriate frequency ranges. In some cases, external (e.g., separate) calibration antennas located in a far-field region of the array antenna can be used for calibrating the array antenna.

In the embodiments described herein, a phased array antenna includes antenna elements that are located on a planar surface with dielectric material that fills the space between the planar surface and a ground plane of the phased array antenna. One or more directional antennas can be located at a periphery of the array antenna (e.g., surrounding the antenna elements). A directional antenna (also referred to as a beam antenna or a directive antenna) is an antenna which radiates or receives greater power in specific directions, which allows for increased performance and reduced interference from unwanted sources. An antenna can be characterized by a directivity, which is a parameter which measures the degree to which radiation emitted by the antenna is concentrated in a single direction. The directivity measures a power density of the radiation in the direction of strongest emission as a function of a power density of an ideal isotropic radiator.

Aspects of the present disclosure overcome the deficiencies of other calibration antennas by providing directional calibration antennas located on a periphery of an array antenna and in a near-field region of the array antenna to couple strongly to antenna elements of the array antenna. A directional antenna can couple more strongly to antenna elements in specific directions than a dipole antenna or other omnidirectional antenna. For example, a directional antenna can be oriented such that the direction between the directional antenna and the array antenna coincides with a highest power density direction for which the directional antenna most strongly radiates or receives electromagnetic energy. Unlike some conventional calibration antennas being located on a tall post that puts the calibration in a far field of an array antenna, embodiments of calibrations described herein can be located at a shorter height, such as a height that corresponds to a near field of an array antenna. Also, embodiments of the calibration antennas can have a simpler mechanical design and can be more compact than conventional calibration antennas. There are fewer constraints on a physical size of the directional antenna located on a periphery of the array antenna (compared to an embedded calibration antenna). Horn antennas can be used as they are directional and do not have resonant elements, allowing them to operate over a wide range of frequencies. A horn antenna can be used to transmit radio frequency (RF) signals from a waveguide or to receive RF signals into the waveguide. Alternatively, other types of directional antennas can be used as the calibration antennas as described herein.

FIG. 1 illustrates an array antenna 100 of a communication system with directional antennas 102 located around a periphery of the array antenna 100 according to one embodiment. In some cases, the array antenna 100 is a phased array antenna. The array antenna 100 can be made up of smaller modules (also referred to as antenna modules or array modules herein) that each include an integer number of antenna elements. The smaller modules can be assembled on a support structure 104 to form the array antenna 100. The array antenna 100 includes a number of antenna elements equal to the number of modules multiplied by the number of antenna elements per module. The antenna elements are located in an area on a first side of the support structure 104. For example, the support structure 104 constrains the area in which the antenna elements are located. The antenna elements can be patch elements, slot elements, helical elements, or other suitable antenna elements. In some cases, the antenna elements are square-shape patch antenna elements. In other embodiments, the antenna elements can be other shapes, such as rectangular, circular, or other suitable shape. In another embodiment, the antenna elements are slots in material as slot elements (slot antennas). Alternatively, the antenna elements can be other types of antenna elements, such as microstrip antennas, planar inverted-F antennas (PIFAs), monopole antennas, dipole antennas, helical antennas, Vivaldi antennas, annular ring antennas, tapered slot antennas, cut-corner patch antennas, turnstile dipole antennas, or the like, that are used in phased array antennas. Alternatively, the elements are not necessarily part of a phased array antenna, but a group of elements that can be used for other wireless communications than beam steering.

In some embodiments, the support structure 104 includes a ground plane on the first side. A dielectric material with a thickness can also be located on the first side. The dielectric material can be characterized by a permittivity, such as a relative permittivity ($\varepsilon_r$) or a dielectric constant. The antenna elements are located on the dielectric material at a distance from the support structure 104 that is equal to the thickness of the dielectric material. Therefore, the antenna elements are located on a first plane that is a distance equal to the thickness of the dielectric material away from the ground plane. The antenna elements are separated by a distance that is an inter-element spacing. In other words, a distance between two adjacent antenna elements is the inter-element spacing. Any two antenna elements are separated by at least the inter-element spacing.

The communication system includes one or more directional antennas 102 located at a periphery of the area and supported by support structures 106. A directional antenna can be characterized by a directivity parameter, and radiates or receives electromagnetic energy with a highest power density in a given direction (e.g., a range of angular values). In one embodiment, a first end of a support structure 106(1) is coupled to the support structure 104 at a periphery of the area, or at an edge of the support structure 104. A directional antenna 102(1) is located at a second end of the support structure 106(1). In some cases, a feed point of the directional antenna 102(1) is located at a first point above the array antenna 100. Additionally or alternatively, the directional antenna 102(1) is located at a first point above the array antenna 100 and at the periphery of the area. The first point is located at a first height above the array antenna 100. The directional antenna 102(1) is located at the first height above a plane of the array antenna 100 and is pointed at the array antenna, for example, such that a portion of a radiation pattern of the directional antenna 102(1) with the highest power density is pointed at the array antenna. In other words, the directional antenna 102(1) is located at the first height above the periphery of the area. The first height is such that the directional antenna 102(1) is located within a distance corresponding to a near-field region of the array antenna 100. The distance is based on the first frequency range. Further, the first height is such that the first point is located within a near-field region of the array antenna 100 operating in the first frequency range. In some embodiments, the first height can be such that the directional antenna 102(1) is either substantially in the near-field region of the antenna array or between the near-field region and a transition zone (between the near-field region and a far-field region) of the antenna array. In other words, the first height is less than a distance corresponding to a far-field region of the array antenna 100. The near-field region of the array antenna 100 can be defined as a region in which an angular distribution of a radiated electromagnetic signal (e.g., electromagnetic field) of the array antenna 100 depends on a distance to the array antenna 100. Additionally or alternatively, the near-field region of the array antenna 100 can be defined as a region including points that are less than a distance (for example, the Fraunhofer distance) from the array antenna 100.

In a further embodiment, a first end of another support structure 106(2) is coupled to the support structure 104 at the periphery of the area, or at an edge of the support structure 104. A directional antenna 102(2) is located at a second end of the support structure 106(2). In some cases, a feed point of the directional antenna 102(2) is located at a second point above the array antenna 100. Additionally or alternatively, the directional antenna 102(2) is located at a second point above the array antenna 100 and at the periphery of the area. The second point is located at a second height above the array antenna 100. The directional antenna 102(2) is located at the second height above the plane of the array antenna 100 and is pointed at the array antenna. In other words, the directional antenna 102(2) is located at the second height above the periphery of the area. The second height is such that the directional antenna 102(2) is located within a near-field region of the array antenna 100. Further, the second height is such that the second point is located within a near-field region of the array antenna 100 operating in the first frequency range. In some embodiments, the second height is the same as the first height. In other embodiments, the second height can be different (either greater than or less than) the first height.

In further embodiments, the communication system can include one or more additional support structures 106 that can be coupled to the support structure 104 at the periphery of the area, or at an edge of the support structure 104. A directional antenna 102 is located at a second end of each of the support structures 106. Each of the directional antennas 102 (including 102(1) and 102(2)) are located within a near-field region of the array antenna 100. In other words, a feed point of each of the directional antennas 102 is located at a point above the array antenna 100, with each point being located in the near-field region of the array antenna 100. Each of the directional antennas 102 can be located at the same height or at different heights above the plane of the array antenna 100. For example, there can be one, two, three, four, or more directional antennas located on support structures coupled to the support structure 104. When each of the directional antennas 102 are located at the same height, the directional antennas 102 can be considered to be in a second plane at a distance away from the first plane and at another (larger) distance from the ground plane.

For example, a first end of a third support structure 106 is coupled to the support structure 104 at the periphery of the area, or at an edge of the support structure 104. A third directional antenna 102 is located at a second end of the third support structure 106. In some cases, a feed point of the third directional antenna 102 is located at a third point above the array antenna 100. Additionally or alternatively, the third directional antenna 102 is located at a third point above the array antenna 100 and at the periphery of the area. The third point is located at a third height above the array antenna 100. The third directional antenna 102 is located at the third height above the plane of the array antenna 100 and is pointed at the array antenna. In other words, the third directional antenna 102 is located at the third height above the periphery of the area. The third height is such that the third directional antenna 102 is located within the near-field region of the array antenna 100. Further, the third height is such that the third point is located within the near-field region of the array antenna 100 operating in the first frequency range. The first height, the second height, and the third height can be the same or different.

Further, a first end of a fourth support structure 106 is coupled to the support structure 104 at the periphery of the area, or at an edge of the support structure 104. A fourth directional antenna 102 is located at a second end of the fourth support structure 106. In some cases, a feed point of the fourth directional antenna 102 is located at a fourth point above the array antenna 100. Additionally or alternatively, the fourth directional antenna 102 is located at a fourth point above the array antenna 100 and at the periphery of the area. The fourth point is located at a fourth height above the array antenna 100. The fourth directional antenna 102 is located at the fourth height above the plane of the array antenna 100 and is pointed at the array antenna. In other words, the third directional antenna 102 is located at the third height above the periphery of the area. The fourth height is such that the fourth directional antenna 102 is located within the near-field region of the array antenna 100. Further, the fourth height is such that the fourth point is located within the near-field region of the array antenna 100 operating in the first frequency range. The first height, the second height, the third height, and the fourth height can be the same or different.

In the depicted embodiment, there are four directional antennas 102 that are coupled to support structures 106 that are coupled to the support structure 104, with the directional antenna 102(1) located on a first edge of the area, the directional antenna 102(2) located on a second edge of the area, a directional antenna 102(3) located on a third edge of the area, and a directional antenna 102(4) located on a fourth edge of the area. It should be noted that the first edge refers to a first portion of a perimeter of the area (or the support structure 104), the second edge refers to a second portion of the perimeter of the area, the third edge refers to a third portion of the perimeter of the area, and the fourth edge refers to a fourth portion of the perimeter of the area. It should also be noted that the support structure 104 has a first planar side and a second planar side that are perpendicular to the first edge, the second edge, the third edge, and the fourth edge. Alternatively, the first, second, third, and fourth edges can be considered first, second, third, and fourth sides of the area. In other embodiments, other numbers of directional antennas 102 can be used as described herein.

In some embodiments, directional antennas 102 can be horn antennas of various configurations that are configured to be used as peripheral calibration antennas to calibrate the array antenna 100. For example, the directional antennas 102 can be rectangular horn antennas, conical horn antennas, pyramidal horn antennas, sectoral horn antennas, exponential horn antennas, corrugated horn antennas, gain horn antennas, feed horn antennas, E-plane horn antennas, H-plane horn antennas, dual-mode conical horn antennas, diagonal horn antennas, ridged horn antennas, septum horn antennas, aperture-limited horn antennas, or the like. Horn antennas act as waveguides that have a smaller cross-sectional area at one end and a larger cross-sectional area at an opposite end. In other embodiments, rather than using a horn antenna, slot antennas which are slightly raised (e.g., above the antenna elements) can be located around the periphery of the area as calibration antennas. In another embodiment, an array antenna can be located at a periphery of the area as one or more calibration antennas. In the embodiment depicted in FIG. 1, each of the directional antennas 102 is identical. However, in other embodiments, each or some of the directional antennas 102 can be a different type of directional antenna or can be the same type of directional antenna with varying dimensions and frequency ranges of operation. For example, in some cases, a communication system can include two or more interleaved array antennas operating in different frequency ranges, and thus two or more configurations of directional antennas operating in corresponding frequency ranges may be located at the periphery of the support structure.

The communication system further includes a circuit board, a first radio frequency (RF) module circuit 108, and a second RF module circuit 110. In one embodiment, the circuit board can serve as the support structure 104. In other embodiments, the circuit board is fixed to the support structure 104. The first RF module circuit 108 and the second RF module circuit 110 are located on a second side of the support structure 104 and/or the circuit board. The second side is opposite the first side on which the antenna elements are located. In one embodiment, the first RF module circuit 108 operates in a first frequency range and the second RF module circuit 110 operates in the first frequency range. In other embodiments, the first RF module circuit 108 operates in a first frequency range and the second RF module circuit 110 operates in a second frequency range. In some embodiments, the first frequency range and the second frequency range are the same. For example, the first frequency range and the second frequency range can both extend from 28.5 GHz to 29.1 GHz. Alternatively, the first RF module circuit 108 and the second RF module circuit 110 can operate at different frequency ranges, but operate at a same frequency during calibration. The array antenna 100 is coupled to the first RF module circuit 108. The directional antennas 102 are coupled to the second RF module circuit 118. The RF module circuits 108 and 110 can each include a baseband processor, and one or more receiver chains and one or more transmitter chains. Each of the receiver or transmitter chains can include radio-frequency front-end (RFFE) circuitry which can include amplifiers, such as low-noise amplifiers (LNAs), variable-gain amplifiers (VGAs), power amplifiers (PAs), and the like, as well as RF filters, local oscillators (LOs), mixers, and the like.

Figure 2:
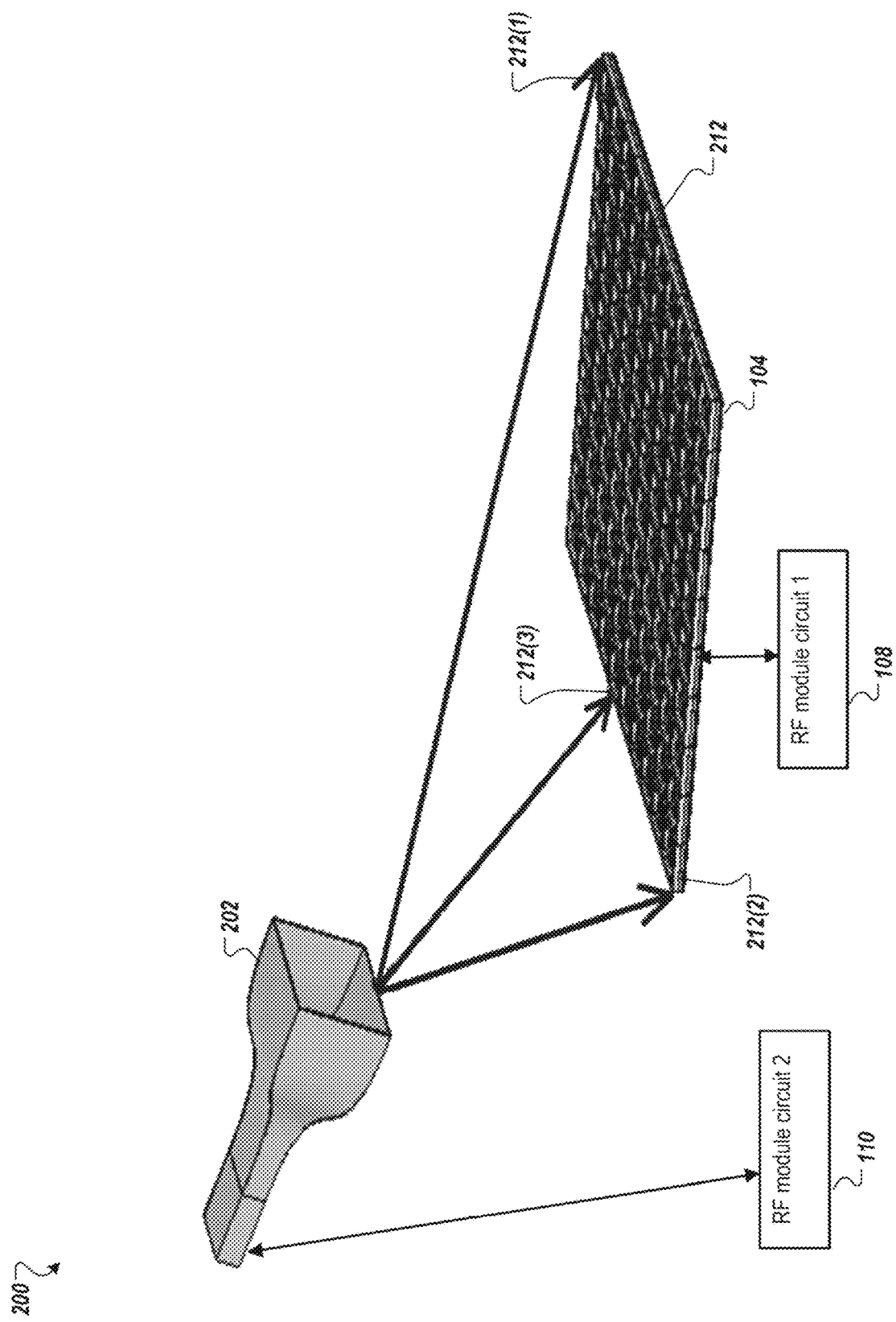
FIG. 2 illustrates an array antenna of a communication system with a directional antenna located around a periphery of the array antenna and in communication with antenna elements according to one embodiment.

FIG. 2 illustrates an array antenna 200 of a communication system with a directional antenna 202 located around a periphery of the array antenna 200 and in communication with antenna elements 212 according to one embodiment. Although not all components of the array antenna 200 are shown, the array antenna 200 is similar to the array antenna 100 of FIG. 1 as noted by similar reference numbers. As depicted in FIG. 2, the array antenna 200 is in communication with at least one antenna element 212. The directional antenna 202 can be used to achieve stronger coupling with the antenna elements 212, as compared to other types of antennas, such as dipole antennas, due to its ability to radiate and/or receive higher power in certain directions. In particular, the directional antenna 202 can be designed to have a radiation pattern with the highest power density in a direction between the directional antenna 202 and the array antenna 200.

The directional antenna 202 is configured to be used as a peripheral calibration antenna to calibrate the array antenna 200. The antenna elements 212 of the array antenna 200 are coupled to the first RF module circuit 108, which operates in a first frequency range. In one embodiment, the first frequency range is 28.5 GHz to 29.1 GHz. In other embodiments, the frequency range can include different frequencies, for example, when the array antenna is intended to be used for various applications. The directional antenna 202 pointed toward the array antenna 200, and is designed to work in the first frequency range. In the depicted embodiment, the directional antenna 202 is a rectangular horn antenna. The frequency range that a horn antenna, such as a rectangular horn antenna, operates in can be determined by physical dimensions of the horn. For example, the directional antenna 202 has a first end (for example that could be coupled to a support structure, such as the support structures 106 of FIG. 1) with a first cross-sectional area and a second end with a second cross-sectional area that is greater than the first cross-sectional area. The frequency range of operation can depend at least on the first cross-sectional area, the second cross-sectional area, and a cross-sectional area profile between the first end and the second end. In the case of a rectangular horn antenna, the first cross-sectional area, the second cross-sectional area, and the profile of the cross-sectional area between the first cross-sectional area and the second cross-sectional area can all be defined by a length and a width.

The directional antenna 202 offers the advantage of being able to couple more strongly to antenna elements 212 that are further away from the directional antenna 202. This gives the communication system the ability to use an appropriate amount of antennas placed around the array. For example, in one embodiment, the directional antenna 202 can be designed and positioned in order to couple more strongly to antenna element 212(1) than to antenna element 212(2). In other embodiments, the directional antenna 202 can be designed and positioned in order to couple more strongly to the antenna element 212(2) than to the antenna element 212(1). In some embodiments, the directional antenna 202 can be designed and positioned in order to couple more strongly to antenna element 212(1) than to antenna element 212(2), while a second directional antenna can be designed and positioned in order to couple more strongly to antenna element 212(2) than to antenna element 212(1).

In the depicted embodiment, for purposes of calibration of the array antenna 200, the directional antenna 202 can generate an RF signal that is received by at least some of the antenna elements 212, including the antenna elements 212(1), 212(2), and 212(3). Calibration of the array antenna 200 happens in two phases. The first phase includes an initial one-time calibration that happens in factory (e.g., before launching or deploying the communication system). During the one-time calibration, the array antenna 200 is made to be in a calibrated state. The array antenna 200 can be calibrated for example, by using an external probe antenna to calibrate to do inter-element calibrations and/or intra-element calibrations in the near-field region of the array antenna 200.

Inter-element calibrations are used to correct for relative amplitude offsets, phase offsets, and/or time delays between antenna elements 212, and can affect the beam-forming and beam-steering capabilities of the array antenna 200. Intra-element calibrations correct for absolute impairments of RF components, which can affect direct current (DC) offsets, LO leakage, and in-phase and quadrature (IQ) imbalance, which can in turn affect transmitter and receiver performance. In other words, the one-time calibration corrects for static differences and offsets of the antenna elements 212. Once the array antenna 200 is calibrated, the directional antenna 202 can be used to gather data from the antenna elements 212. The data can include at least phase and amplitude data for each of the antenna elements 212. The data can be stored as reference data, which is also referred to as a "golden standard." In some embodiments, the communication system includes more than one directional antenna, and reference data can be obtained by each of the directional antennas and stored.

The second phase includes periodic in-orbit calibrations (e.g., after launching or deploying the communication system). During in-orbit calibrations, the directional antenna 202 gathers data from the antenna elements 212 in the same way as it gathered the reference data during the one-time calibration. In this way, the data can be compared to the reference data, and amplitude offsets, phase offsets, and/or time delays of RF components of the antenna elements 212 can be corrected for or adjusted. For example, in some cases, there may be a discrepancy between the data and the reference data, which indicates that at least one of an amplitude offset, a phase offset, and a time delay of RF components of one or more antenna elements 212 require a re-calibration. In other cases, there may be no discrepancies between the data and the reference data, which indicates that the array antenna 200 is still calibrated. In the case when there is more than one directional antenna, each directional antenna can be used to gather data from the antenna elements 212, and data from each of the directional antennas can be compared to the corresponding reference data.

The one-time calibration and the in-orbit calibrations can be done by generating waveforms that are communicated between the antenna elements 212 and the external probe antenna or the directional antenna 202 respectively. The waveforms can be sinusoidal, continuous, square, saw-tooth, multi-tone, etc. Additionally or alternatively, other methods of calibration can be used. Similar methods can be used to calibrate both receiver chains and transmitter chains of the antenna elements 212.

Figure 3:
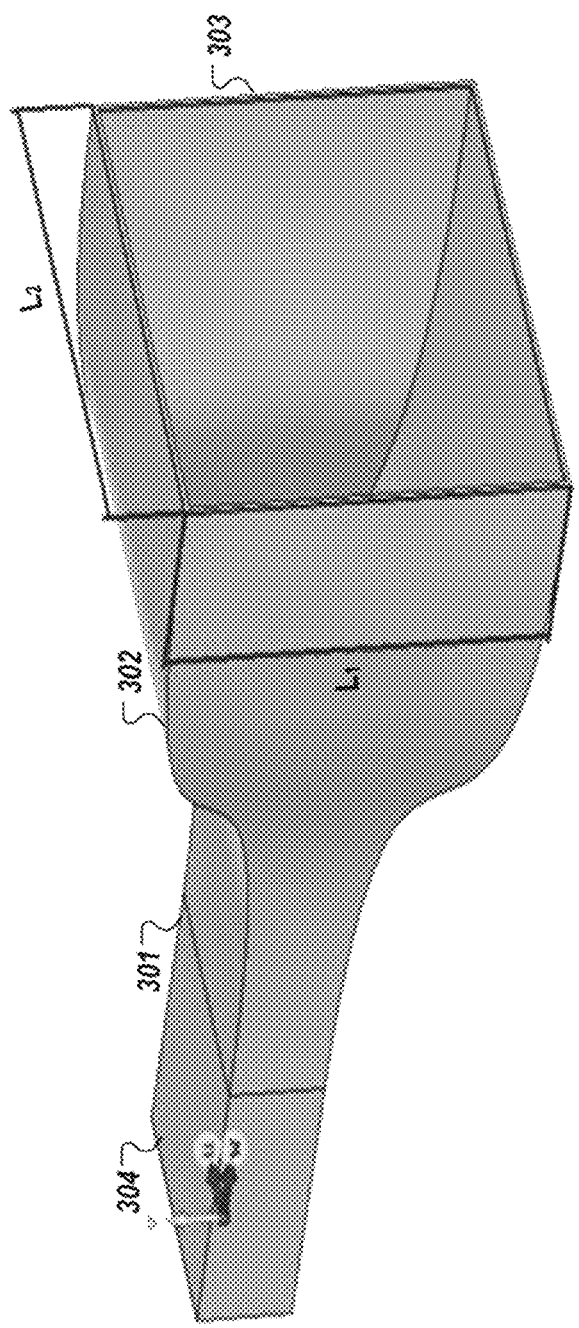
FIG. 3 illustrates a rectangular horn antenna for calibrating an array antenna according to one embodiment.

FIG. 3 illustrates a rectangular horn antenna 302 for calibrating an array antenna 300 according to one embodiment. Although not all components of the array antenna 300 are shown, the array antenna 300 is similar to the array antenna 100 as noted by similar reference numbers. The rectangular horn antenna 302 is one example of a directional antenna that can be used for calibrating the antenna array 300. The rectangular horn antenna 302 includes a first end 301 and a second end 303. The first end 301 has a first cross-sectional area and is coupled to a support structure, such as the support structures 106 of FIG. 1. The first end 301 can be coupled to a waveguide 304. A waveguide is a structure that guides electromagnetic waves in one direction. Waveguide 304 can be coupled to an RF port of second RF module circuit 118 via a transmission line or other conductive path. Waveguide 304 can be physically coupled to the support structure. The second end 303 has a second cross-sectional area which is greater than the first cross-sectional area. At any point between the first end 301 and the second end 303, the rectangular horn antenna 302 has a cross-sectional area which is inclusively between the first cross-sectional area and the second cross-sectional area. In the case of a rectangular horn antenna, the first cross-sectional area and the second cross-sectional area can be characterized by two linear and mutually perpendicular dimensions (e.g., a length and a width, a length and a height, etc.). In some embodiments, the array antenna 300 is designed to operate in a frequency range between 28.5 GHz to 29.1 GHz. Linear dimensions can be between approximately 1 to 3λ, where λ corresponds to a wavelength. The second cross-sectional area has a first linear dimension $L_1$ and a second linear dimension $L_2$. In one embodiment, a first linear dimension is approximately 11.821 mm and a second linear dimension is approximately 13.286 mm. In other embodiments, the array antenna 300 can be designed to operate in a different frequency range, and thus would have a different second cross-sectional area (e.g., a different first linear dimension $L_1$ and/or a different second linear dimension $L_2$).

Figure 4:
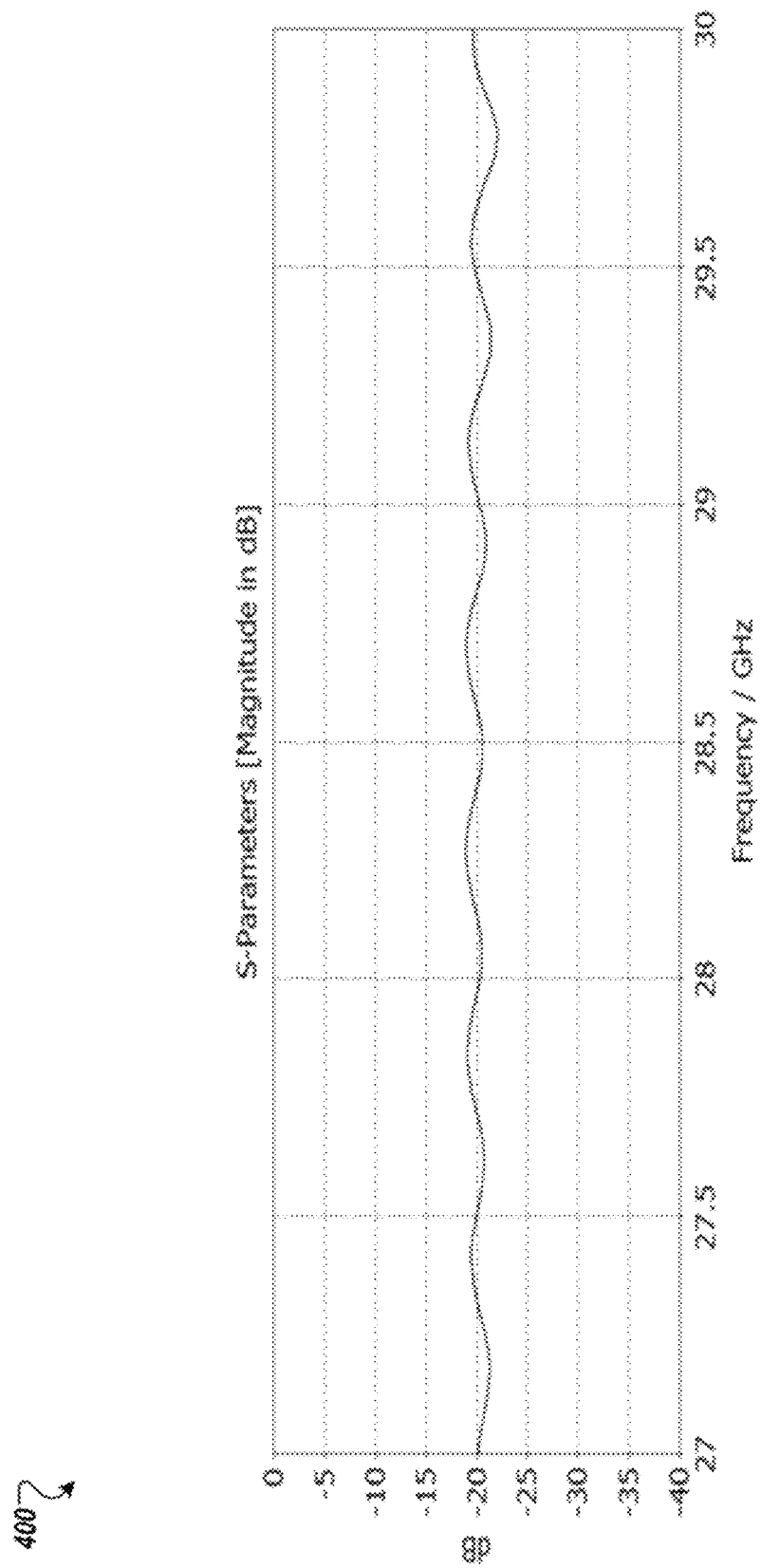
FIG. 4 is a graph showing a return loss of the rectangular horn antenna of FIG. 3 according to one embodiment.

FIG. 4 is a graph 400 showing a return loss of the rectangular horn antenna 302 of FIG. 3 according to one embodiment. A return loss can indicate how well an antenna performs. For example, an antenna with a lower return loss has better performance than an antenna with a higher return loss at a given frequency. The graph 400 indicates a desirable return loss within the range of frequency of operation (28.5 GHz to 29.1 GHz) of the rectangular horn antenna 302 of FIG. 3. As shown in graph 400, the return loss is less than −10 dB over the entire range, showing the rectangular horn antenna 302 as a viable antenna for the directional calibration antenna.

Figure 5:
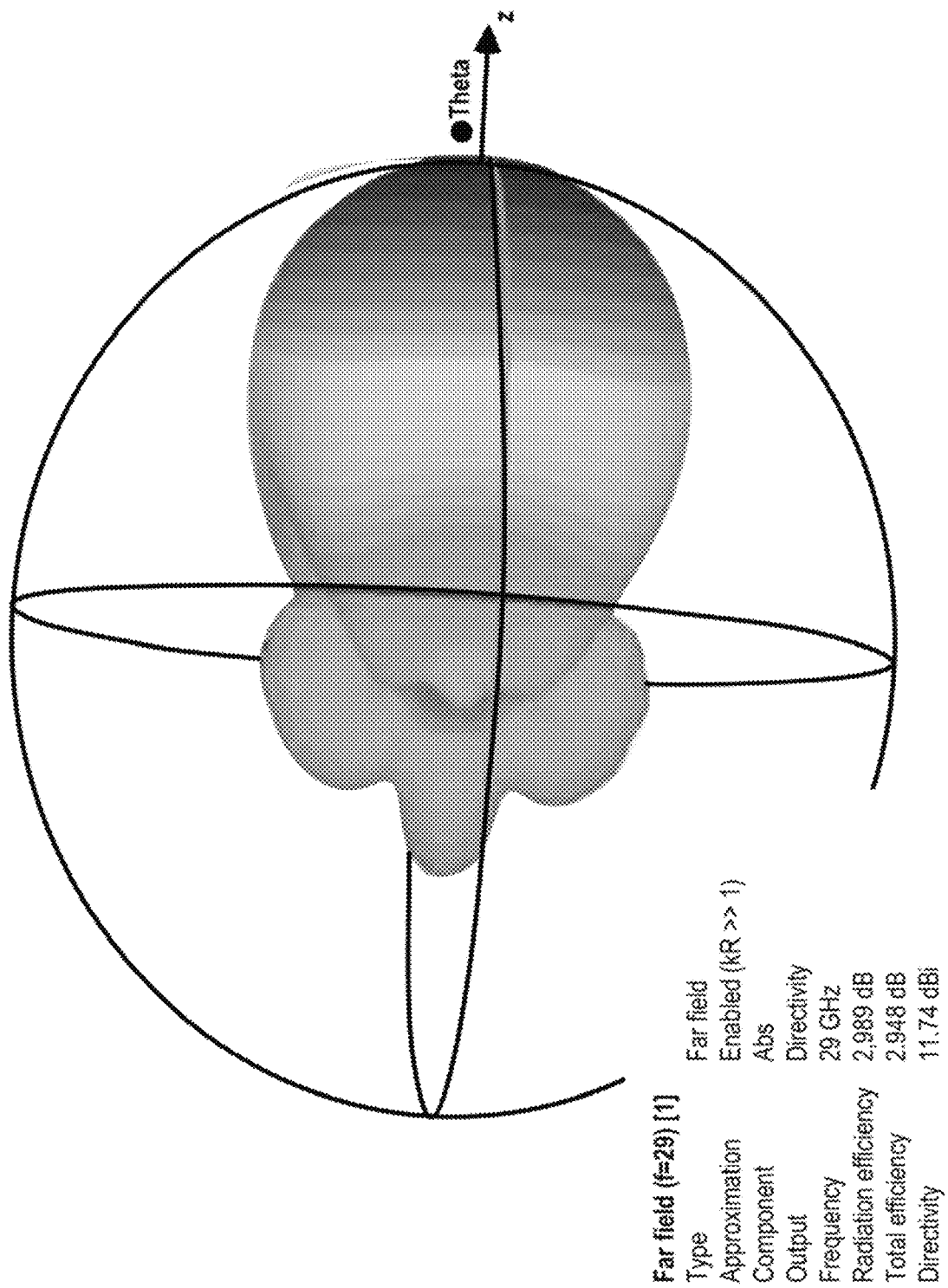
FIG. 5 is a three-dimensional (3D) radiation pattern of the rectangular horn antenna of FIG. 3 according to one embodiment.

FIG. 5 is a three-dimensional (3D) radiation pattern 500 of the rectangular horn antenna 302 of FIG. 3 according to one embodiment. The radiation pattern and directivity of a directional antenna can affect the performance of the directional antenna as a calibration antenna. The radiation pattern 500 indicates that the directivity of the rectangular horn antenna 302 is approximately 11.7 dBi. The radiation pattern 500 shows that the rectangular horn antenna 302 can be pointed at an array antenna (such as the array antenna 100 of FIG. 1, or other array antennas described herein) and coupling values between the rectangular horn antenna and the antenna elements could be read or measured successfully. As shown in FIG. 5, the radiation pattern 500 is a directive radiation pattern that has a directivity parameter at the desired frequency range.

Figure 6:
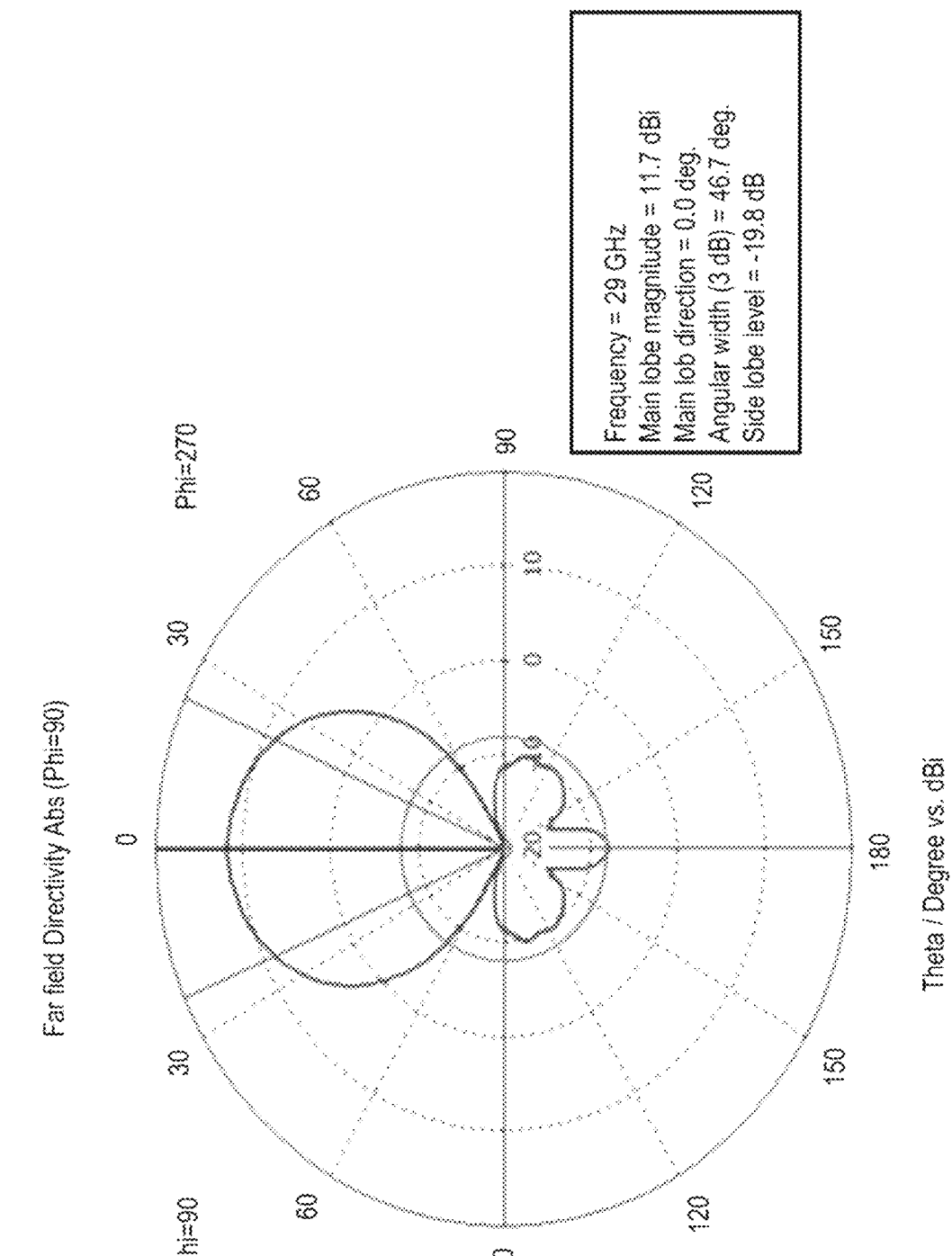
FIG. 6 is a two-dimensional (2D) angular radiation pattern of the rectangular horn antenna of FIG. 3 according to one embodiment.

FIG. 6 is a two-dimensional (2D) angular radiation pattern 600 of the rectangular horn antenna 302 of FIG. 3 according to one embodiment. The radiation pattern 600 indicates that a magnitude of a main lobe at Theta=0 degrees is approximately 11.7 dBi.

Figure 7:
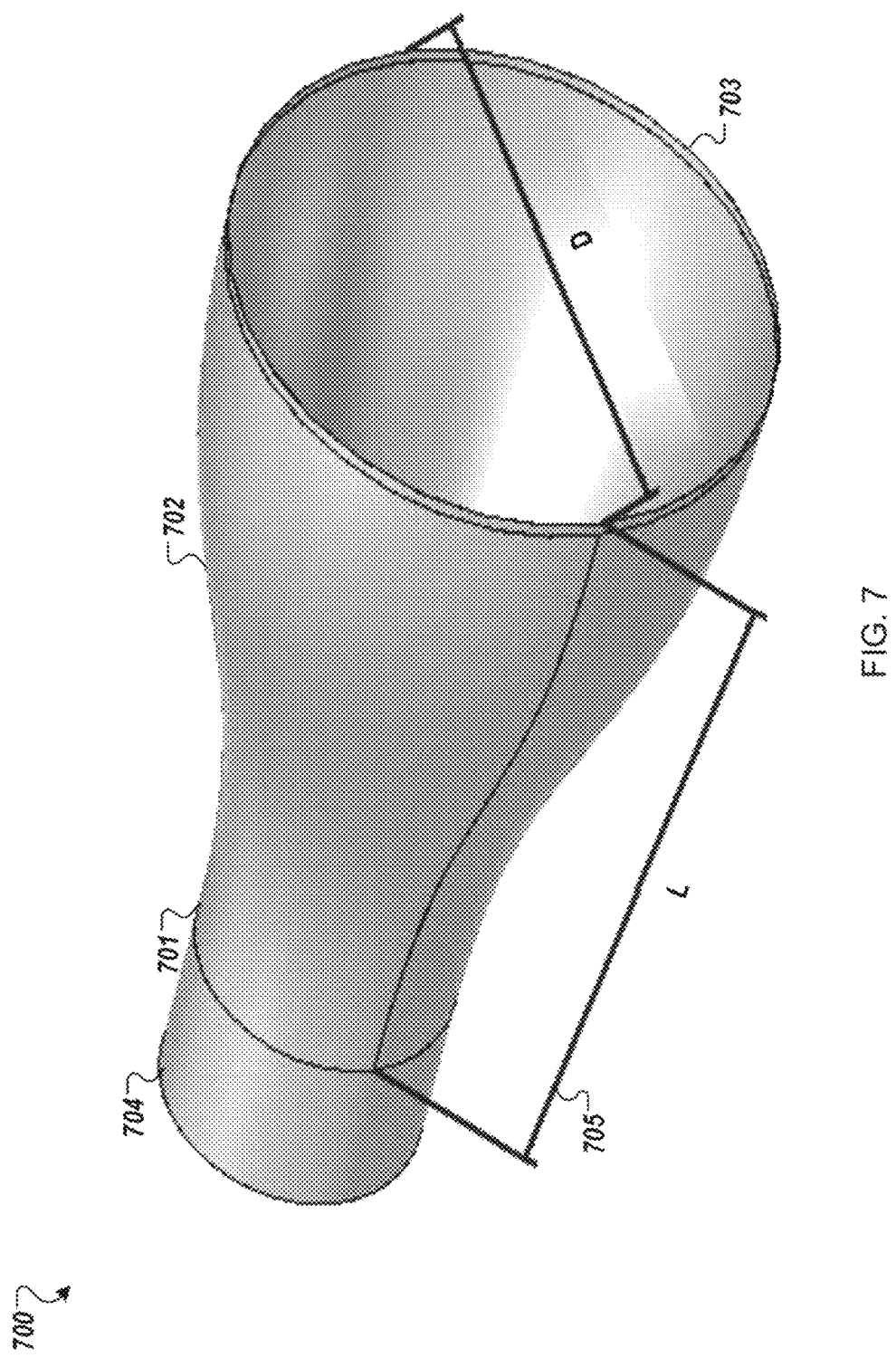
FIG. 7 illustrates a conical horn antenna for calibrating an array antenna according to one embodiment.

FIG. 7 illustrates a conical horn antenna 702 for calibrating an array antenna 700 according to one embodiment. Although not all components of the array antenna 700 are shown, the array antenna 700 is similar to the array antenna 100 of FIG. 1 as noted by similar reference numbers. The conical horn antenna 702 is one example of a directional antenna that can be used for calibrating the antenna array 700. The conical horn antenna 702 includes a first end 701 and a second end 703 separated by a distance 705 (L). The first end 701 has a first cross-sectional area and is coupled to a support structure, such as the support structures 106 of FIG. 1. The first end 701 can be coupled to a waveguide 704. Waveguide 704 can be coupled to an RF port of an RF module circuit via a transmission line or other conductive path. Waveguide 704 can be physically coupled to the support structure. The second end 703 has a second cross-sectional area which is greater than the first cross-sectional area. At any point between the first end 701 and the second end 703, the conical horn antenna 702 has a cross-sectional area which is inclusively between the first cross-sectional area and the second cross-sectional area. In the case of a conical horn antenna, the first cross-sectional area and the second cross-sectional area are circular and can each be characterized by a single dimension (e.g., a circumference, a diameter, a radius, etc.). For example, the second cross-sectional area can be characterized by a diameter D. In some embodiments, the array antenna 700 is designed to operate in a frequency range between 28.5 GHz to 29.1 GHz. Dimensions of the areas can vary based on a range corresponding to a wavelength as described herein. For example, in one embodiment the diameter of the second cross-sectional area is approximately 14.236 mm and the distance 705 is approximately 20.751 mm. In other embodiments, the array antenna 700 can be designed to operate in a different frequency range, and thus would have a different second cross-sectional area (e.g., a different circumference, diameter, radius, etc.). To radiate in the same frequency range as the rectangular horn antenna 302 of FIG. 3, both the rectangular horn antenna 302 and the conical horn antenna 702 are comparable in size.

Figure 8:
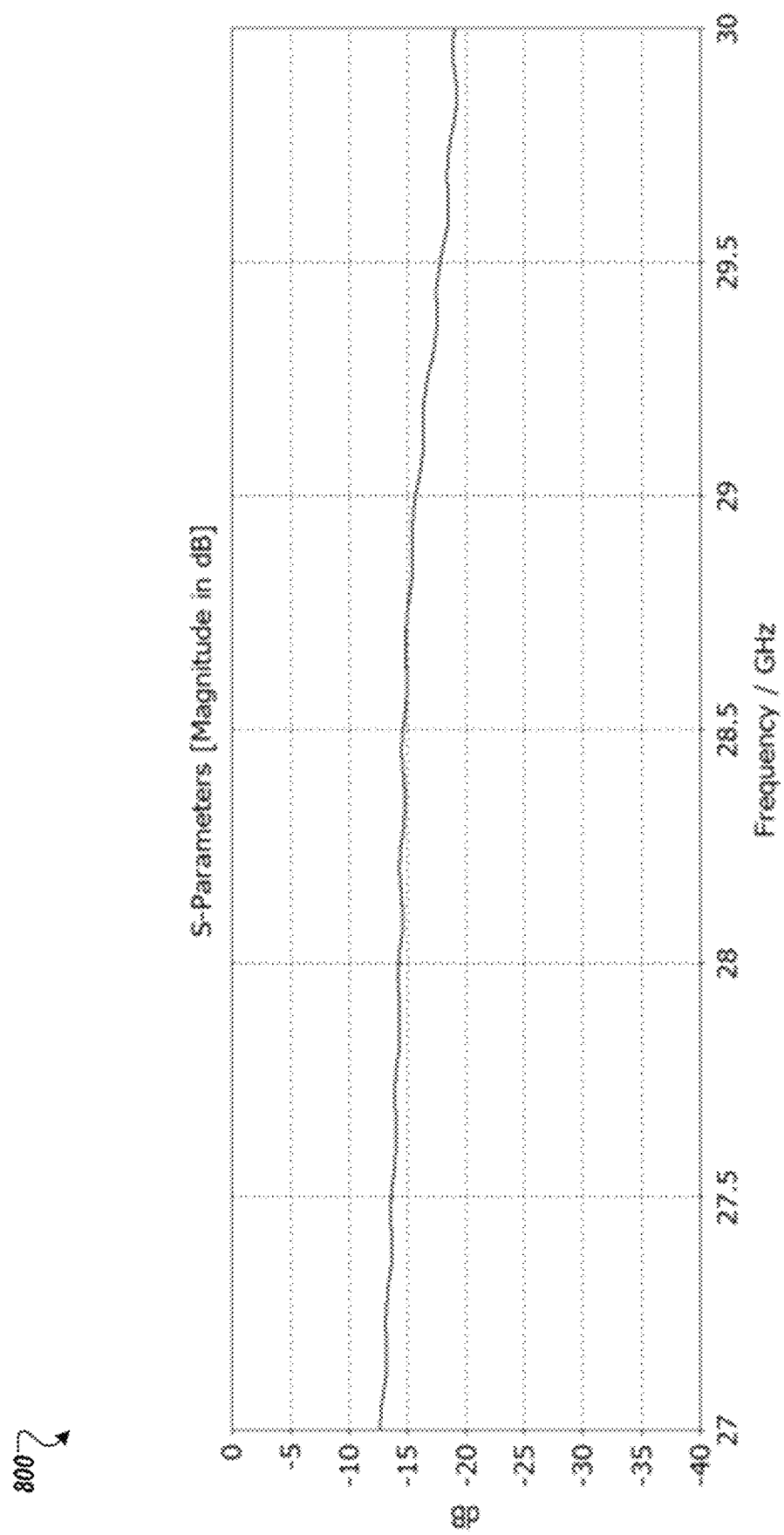
FIG. 8 is a graph showing a return loss of the conical horn antenna of FIG. 7 according to one embodiment.

FIG. 8 is a graph 800 showing a return loss of the conical horn antenna 702 of FIG. 7 according to one embodiment. A return loss can indicate how well the conical horn antenna 702 antenna performs. The graph 800 indicates a desirable return loss within the range of frequency of operation (28.5 GHz to 29.1 GHz) of the conical horn antenna 702 of FIG. 7. As shown in graph 800, the return loss is less than −10 dB over the entire range, showing the conical horn antenna 702 as a viable antenna for the directional calibration antenna.

Figure 9:
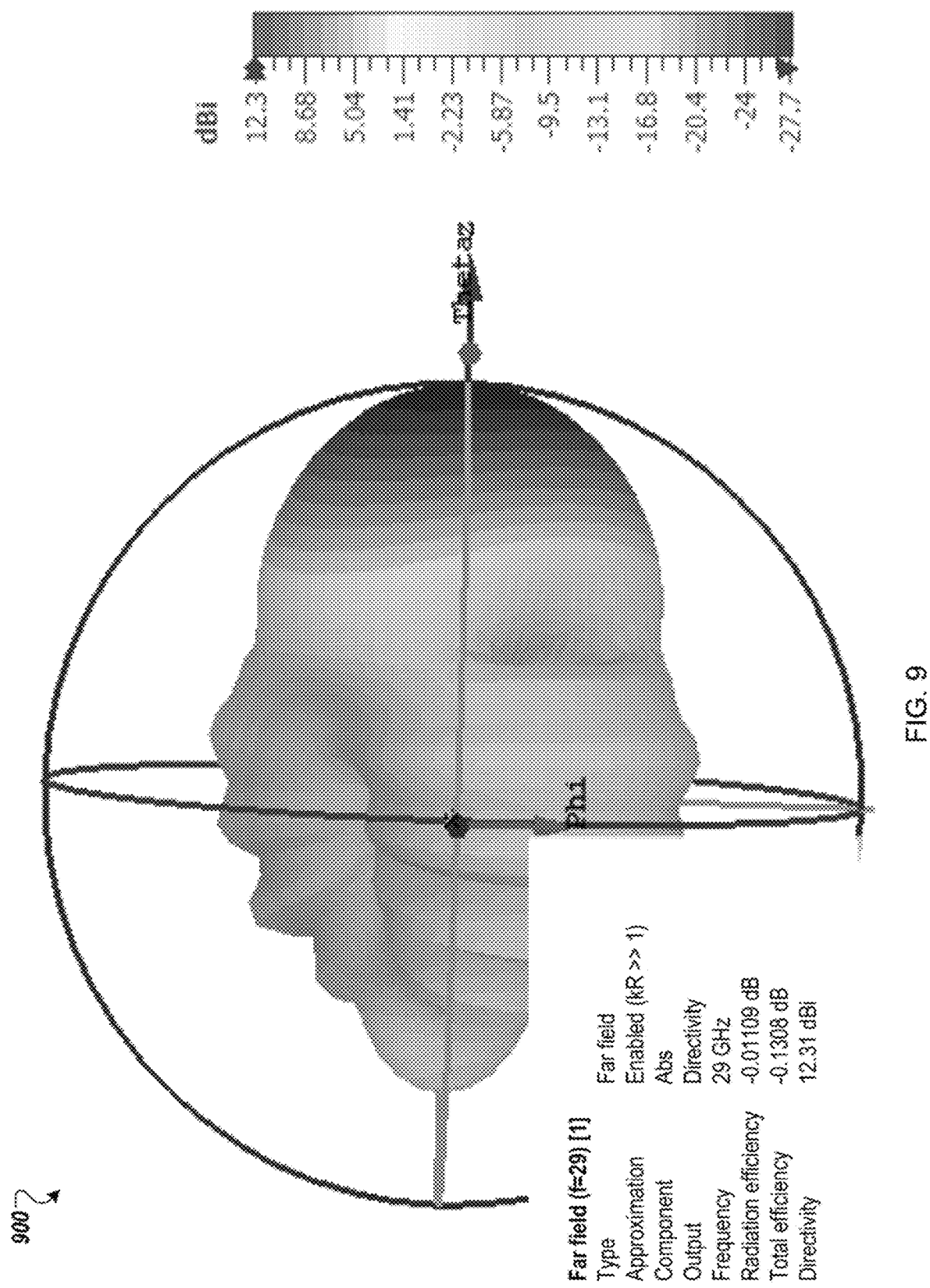
FIG. 9 is a 3D radiation pattern of the conical horn antenna of FIG. 7 according to one embodiment.

FIG. 9 is a 3D radiation pattern 900 of the conical horn antenna 702 of FIG. 7 according to one embodiment. The radiation pattern and directivity of a directional antenna can affect the performance of the directional antenna as a calibration antenna. The radiation pattern 900 indicates that the directivity of the conical horn antenna 702 is approximately 12.31 dBi. The radiation pattern 900 shows that the conical horn antenna 702 can be pointed at an array antenna (such as the array antenna 100 of FIG. 1, or other array antennas described herein) and coupling values between the conical horn antenna and the antenna elements could be read or measured successfully. As shown in FIG. 9, the radiation pattern 900 is a directive radiation pattern that has a directivity parameter at the desired frequency range.

Figure 10:
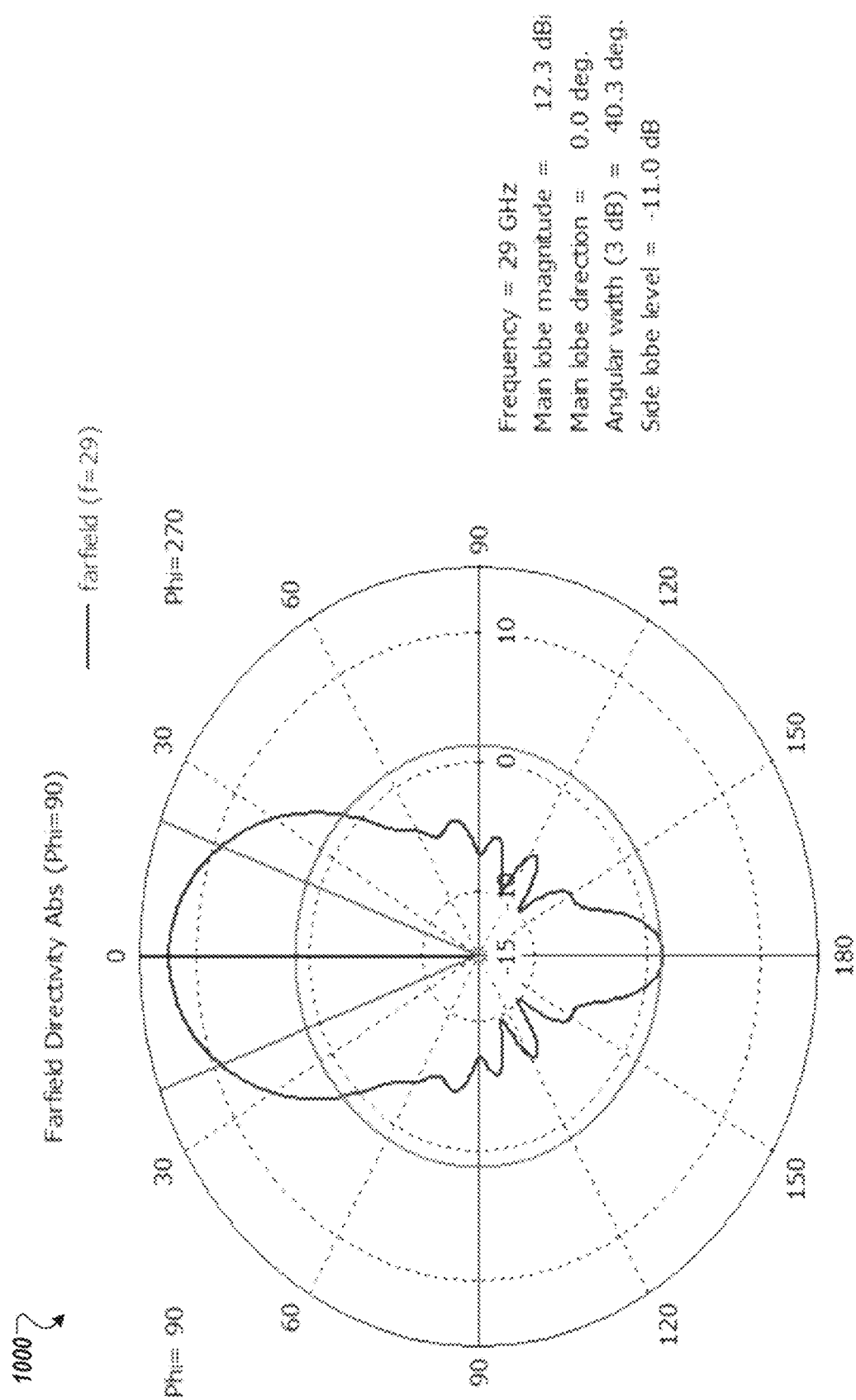
FIG. 10 is a 2D angular radiation pattern of the conical horn antenna of FIG. 7 according to one embodiment.

FIG. 10 is a 2D angular radiation pattern 1000 of the conical horn antenna 702 of FIG. 7 according to one embodiment. The radiation pattern 1000 indicates that a magnitude of a main lobe at Theta=0 degrees is approximately 12.3 dBi.

Figure 11:
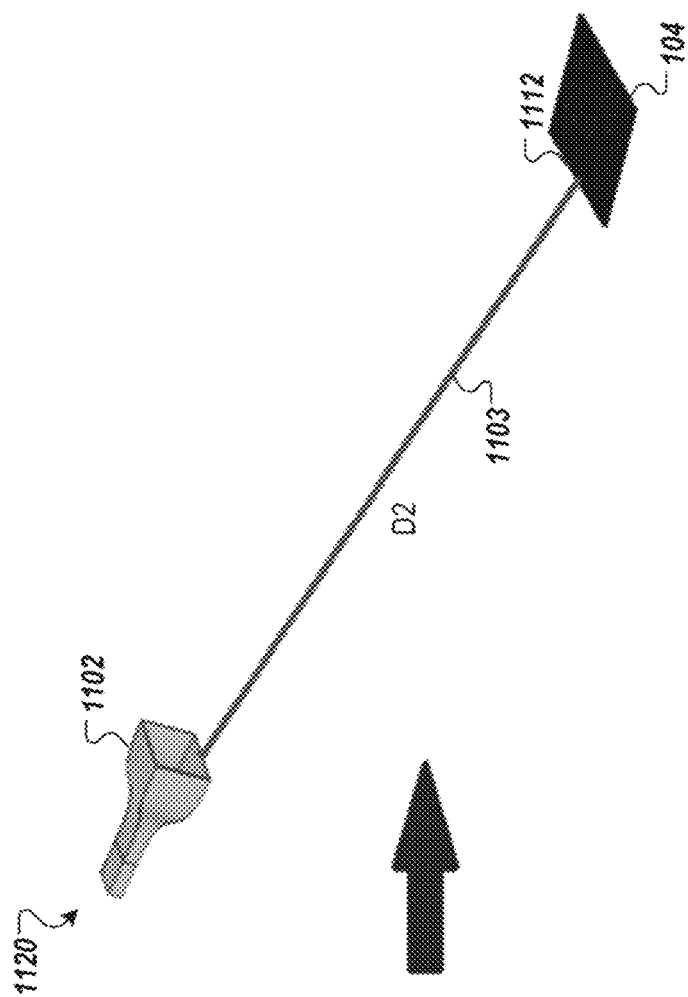
FIG. 11 illustrates a first configuration of a directional antenna pointing at an array antenna from a first distance and a second configuration of the directional antenna pointing at the array antenna from a second distance according to one embodiment.
Figure 11:
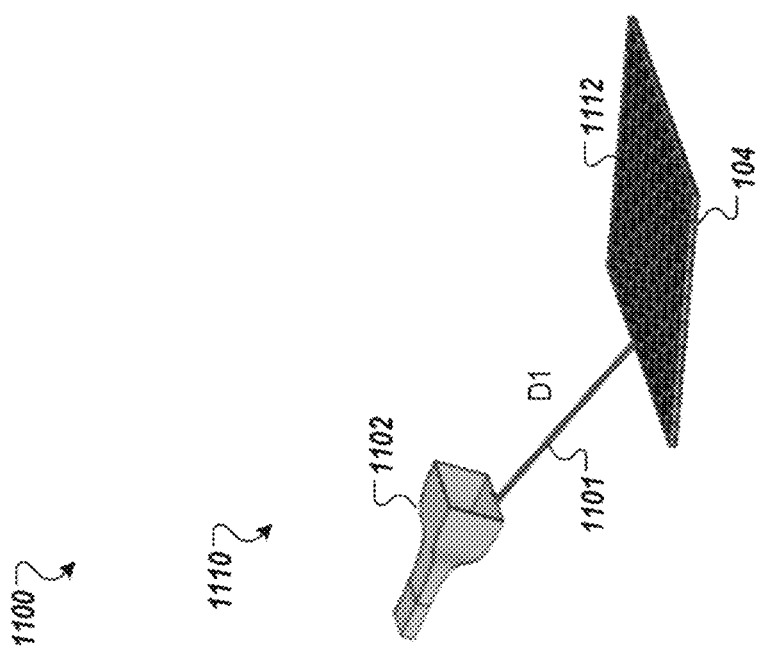

FIG. 11 illustrates a first configuration 1110 of a directional antenna 1102 pointing at an array antenna 1100 from a first distance 1101 (D1) and a second configuration 1120 of the directional antenna 1102 pointing at the array antenna 1100 from a second distance 1103 (D2) according to one embodiment. Although not all components of the array antenna 1100 are shown, the array antenna 1100 is similar to the array antenna 100 of FIG. 1 as noted by similar reference numbers. Distances D1 and D2 can vary based on various factors, including frequency of operation or a corresponding wavelength. For example, as depicted, the second distance (e.g., 273 mm) is larger than the first distance (e.g., 37 mm). S-parameters of the directional antenna 1102 can be gathered in both the first configuration 1110 and the second configuration 1120. The S-parameters refer to a response of the directional antenna 1102 to a given antenna element 1112. In particular, as described for the directional antenna 1102, the S-parameters refer to a coupling value between the directional antenna 1102 and a given antenna element 1112. At the first distance 1101, the coupling values between the directional antenna 1102 and each antenna element 1112 can be measured, and a largest coupling value can be established. At the second distance 1103, which is larger than the first distance 1101, the coupling values can be measured, and a smallest coupling value can be established. The largest coupling value and the smallest coupling value can be indicative of a coupling range of the directional antenna 1102. It should be noted that in the following description, the coupling range is representative of a distance between the directional antenna (e.g., the directional antenna 1102 in the depicted embodiment) and a first antenna element that is closest in distance to the directional antenna and a second antenna element that is furthest from the directional antenna. A distance between the directional antenna and the second antenna element refers to a distance at which the directional antenna and the second antenna element can communicatively couple with a coupling value above a given threshold value.

Figure 12:
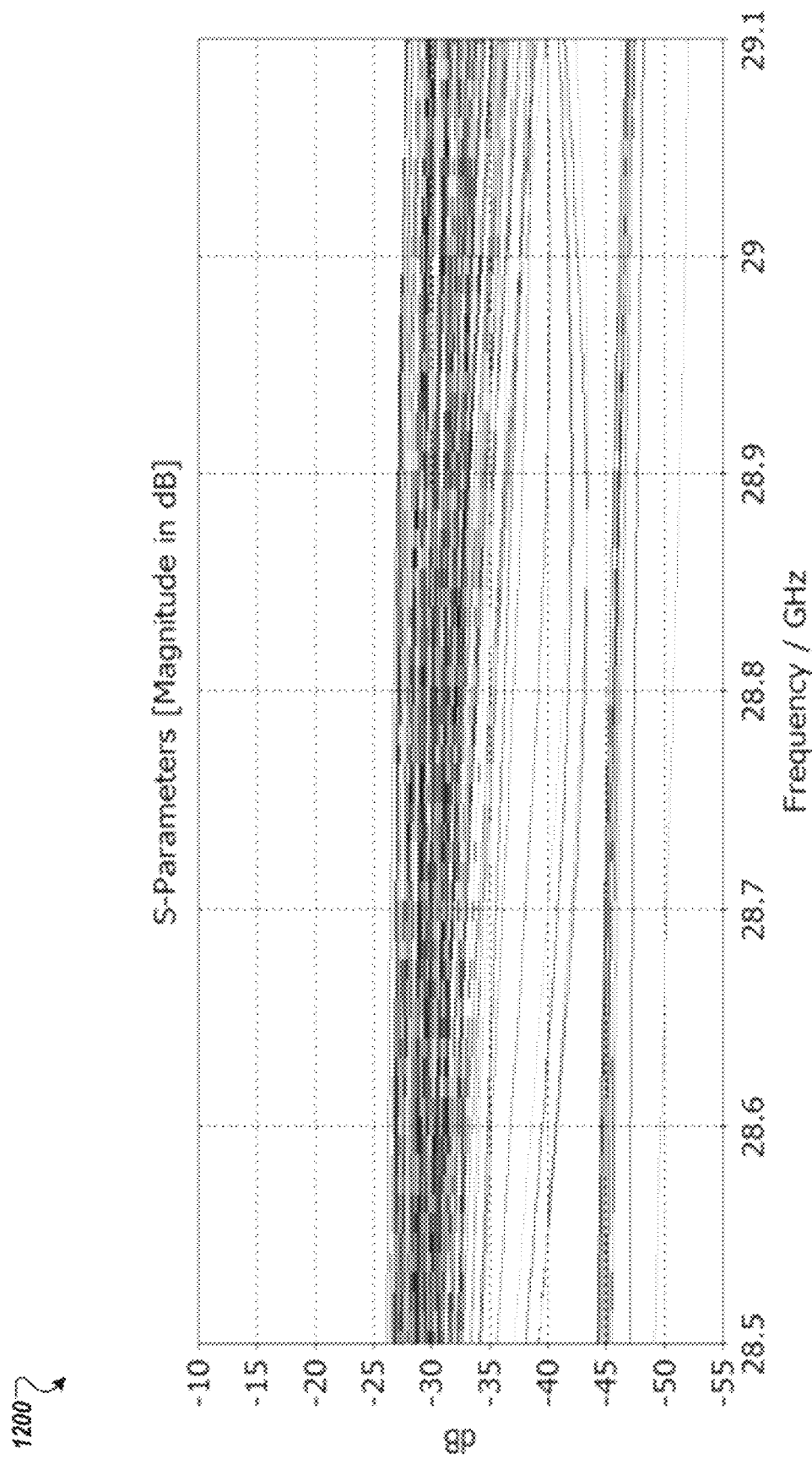
FIG. 12 is a graph showing coupling values between a directional antenna and each antenna element of a set of antenna elements of an array antenna when the directional antenna and the array antenna are separated by a first distance according to one embodiment.

FIG. 12 is a graph 1200 showing coupling values between a directional antenna and each antenna element of a set of antenna elements of an array antenna when the directional antenna and the array antenna are separated by a first distance according to one embodiment. Graph 1200 shows an insertion loss as an amount of coupling between the directional antenna and elements of the array antenna. The directional antenna, the set of antenna elements, and the array antenna can be any of the directional antennas (including the rectangular horn antenna 302 of FIG. 3 and/or the conical horn antenna 702 of FIG. 7), antenna elements, and array antennas as described with respect to FIGS. 1-3, 7, and 11. In the depicted embodiment, the first distance is 37 mm and the largest coupling value is approximately −26 dB. In other embodiments, the largest coupling value can be found at a first distance which is different than 37 mm. Graph 1200 shows that data is readable as the coupling values are −50 dB or higher.

Figure 13:
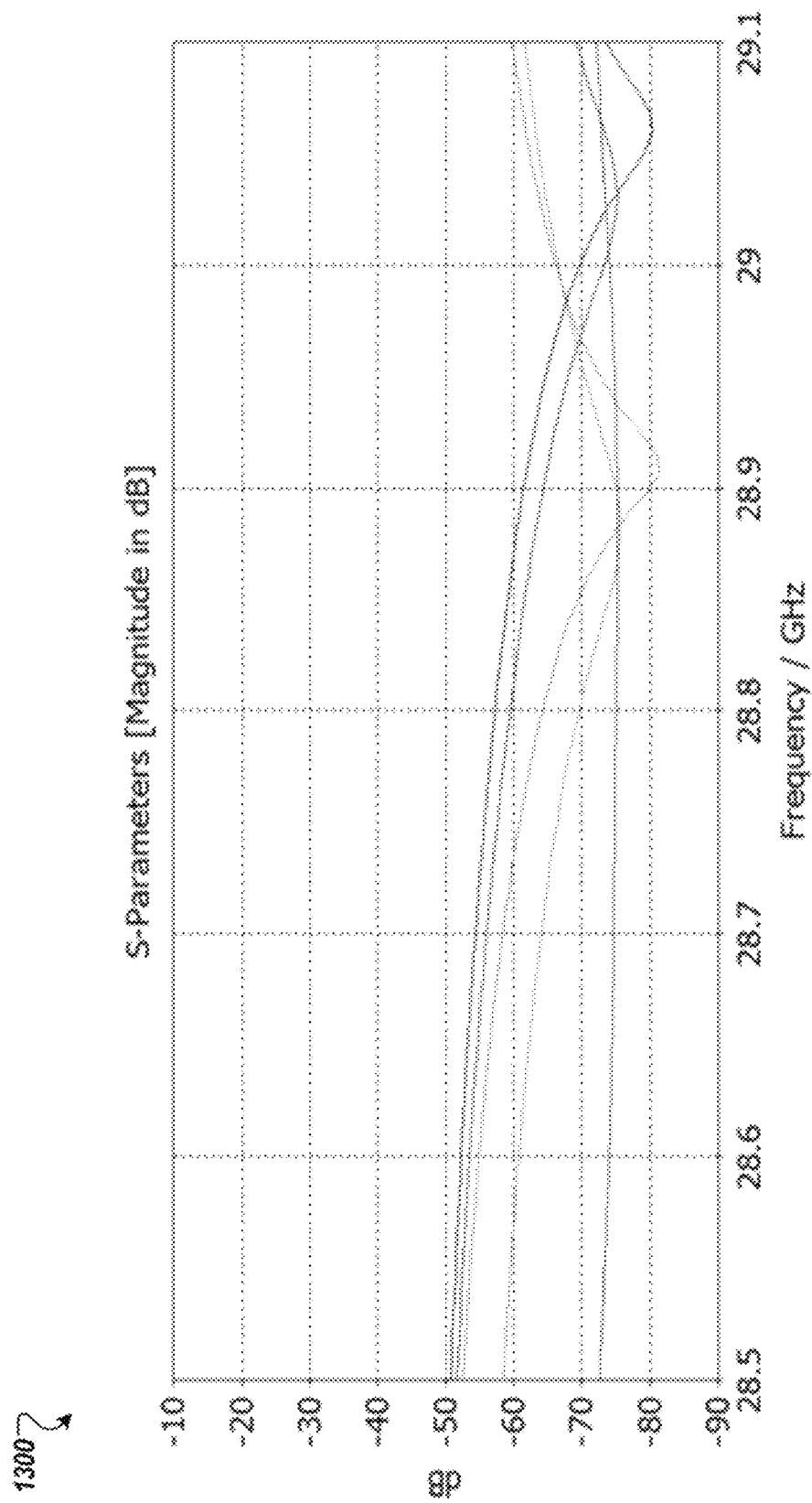
FIG. 13 is a graph showing minimum coupling values between a directional antenna and each antenna element of a set of antenna elements of an array antenna when the directional antenna and the array antenna are separated by a second distance according to one embodiment.

FIG. 13 is a graph 1300 showing minimum coupling values between a directional antenna and each antenna element of a set of antenna elements of an array antenna when the directional antenna and the array antenna are separated by a second distance according to one embodiment. The directional antenna, the set of antenna elements, and the array antenna can be any of the directional antennas (including the rectangular horn antenna 302 of FIG. 3 and/or the conical horn antenna 702 of FIG. 7), antenna elements, and array antennas as described with respect to FIGS. 1-3, 7, and 11. In the depicted embodiment, the second distance is 273 mm. In other embodiments, the minimum coupling value can be found at a second distance which is different than 273 mm. Based on the graph 1200 of FIG. 12 and the graph 1300, the coupling range can be established indicating that the directional antenna can still couple to antenna elements of the array antenna that are farther than the second distance. In some embodiments, the coupling range can decrease as the number of directional antennas is increased. In some embodiments, the communication system includes a number of directional antennas in order to decrease the coupling range. In some embodiments the coupling range is representative of a distance between the directional antenna (e.g., the directional antenna 1102 in the depicted embodiment) and a first antenna element that is closest in distance to the directional antenna and a second antenna element that is furthest from the directional antenna. A distance between the directional antenna and the second antenna element refers to a distance at which the directional antenna and the second antenna element can communicatively couple with a coupling value above a given threshold value. Graph 1300 shows a scenario where the direction antenna and antenna elements are farther away and still coupling for reading data around −90 dB or higher.

Figure 14:
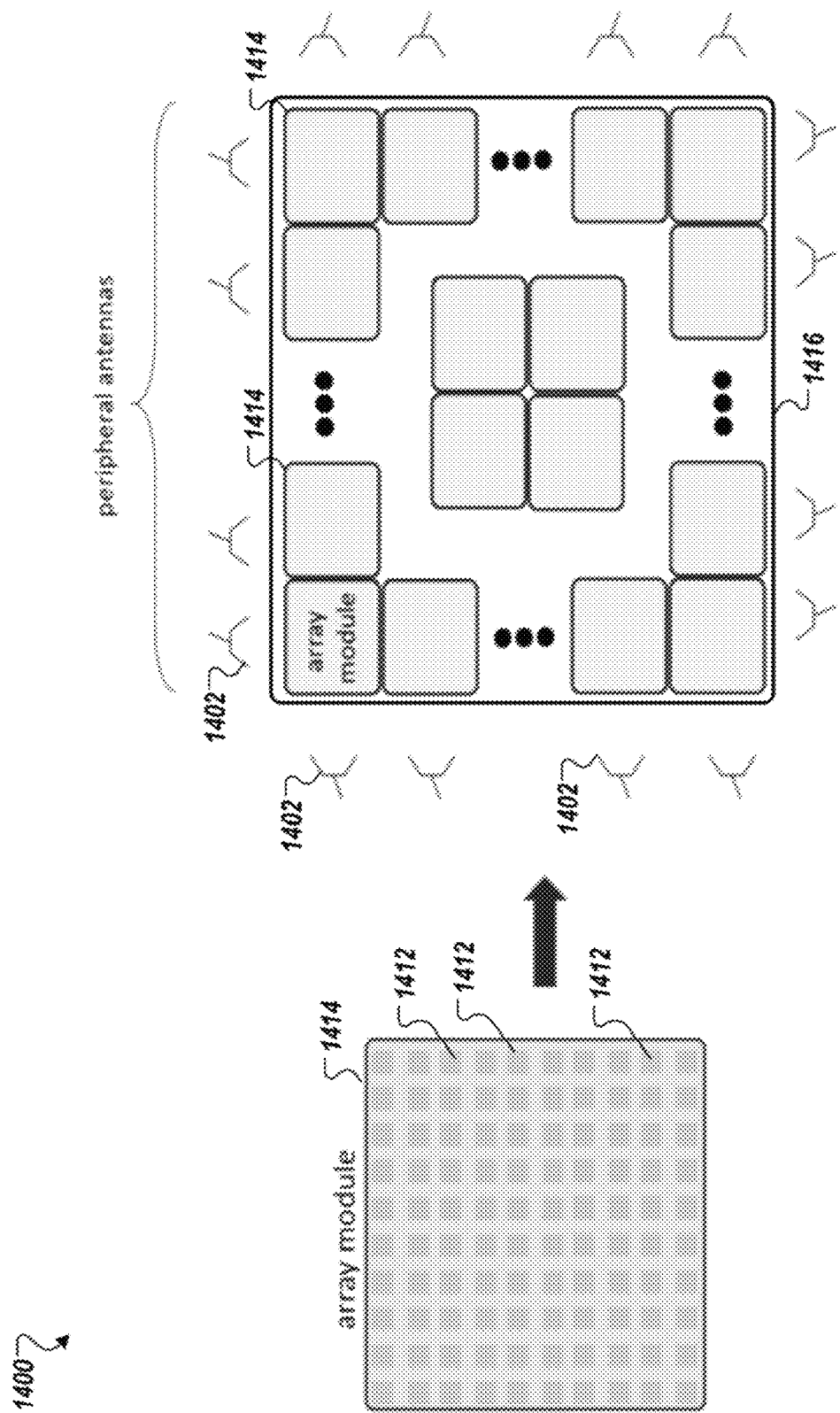
FIG. 14 illustrates a number of directional antennas placed around a periphery of an array antenna in order to calibrate the array antenna according to one embodiment.

FIG. 14 illustrates a communication system with a number of directional antennas 1402 placed around a periphery of an array antenna 1400 in order to calibrate the array antenna 1400 according to one embodiment. Although not all components of the array antenna 1400 are shown, the array antenna 1400 is similar to the array antenna 100 of FIG. 1 as noted by similar reference numbers. An array antenna, such as the array antenna 1400, can include hundreds to thousands of antenna elements 1412. The array antenna 1400 can be constructed of modules 1414 that include an integer number of antenna elements 1412, and thus the array antenna 1400 includes a total number of antenna elements 1412 equal to the number of modules 1414 multiplied by the integer number of antenna elements 1412 in one module 1414. As depicted in FIG. 14, a module 1414 includes one hundred antenna elements 1412 arranged in a 10×10 square grid pattern. The antenna elements 1412 are located in an area 1416 on a first side of a support structure (not shown in FIG. 14) to which the modules 1414 are attached.

One or more directional antennas 1402 are located at a periphery of the area 1416. In the depicted embodiment, a set of directional antennas 1402 are located around a perimeter of the array antenna 1400 such that a first subset of directional antennas 1402 is adjacent to a first edge of the array antenna 1400, a second subset of directional antennas 1402 is adjacent to a second edge of the array antenna 1400, a third subset of directional antennas 1402 is adjacent to a third edge of the array antenna 1400, and a fourth subset of directional antennas 1402 is adjacent to a fourth edge of the array antenna 1400. The total number of directional antennas 1402 to be included in the communication system depends on (e.g., is a function of) the directivity of the directional antenna as well as the size of the array antenna (e.g., the total number of antenna elements 1412) that should be calibrated. As described with respect to FIG. 13, the directional antennas 1402 can be located at a third distance greater than the second distance (e.g., 273 mm) and still have a coupling values which are sufficiently large to be measurable. Each directional antenna 1402 has a coupling range of coupling values. In some embodiments, it is desirable to include a sufficient number of directional antennas 1402 in the communication system such that each antenna element 1412 can be coupled to two or more directional antennas 1402. By ensuring that each antenna element 1412 is coupled to two or more directional antennas 1402, data corresponding to a given antenna element 1412 that is collected via the directional antennas 1402 is redundant, and periodic in-orbit calibration of the array antenna 1400 can be correctly performed on an over-defined system. In some cases, the total number of directional antennas 1402 can be reduced when variations in the coupling ranges are compensated by a gain control of the transceiver to ensure that a signal-to-noise ratio (SNR) remains constant.

Although the directional antennas 1402 are depicted as surrounding the periphery of the area 1416 (e.g., a perimeter of the area 1416), in other embodiments, directional antennas can be located along just one edge of the area, along two adjacent edges of the area, along two opposite edges of the area, along three edges of the area, at one or more corners of the area, or the like.

Figure 15:
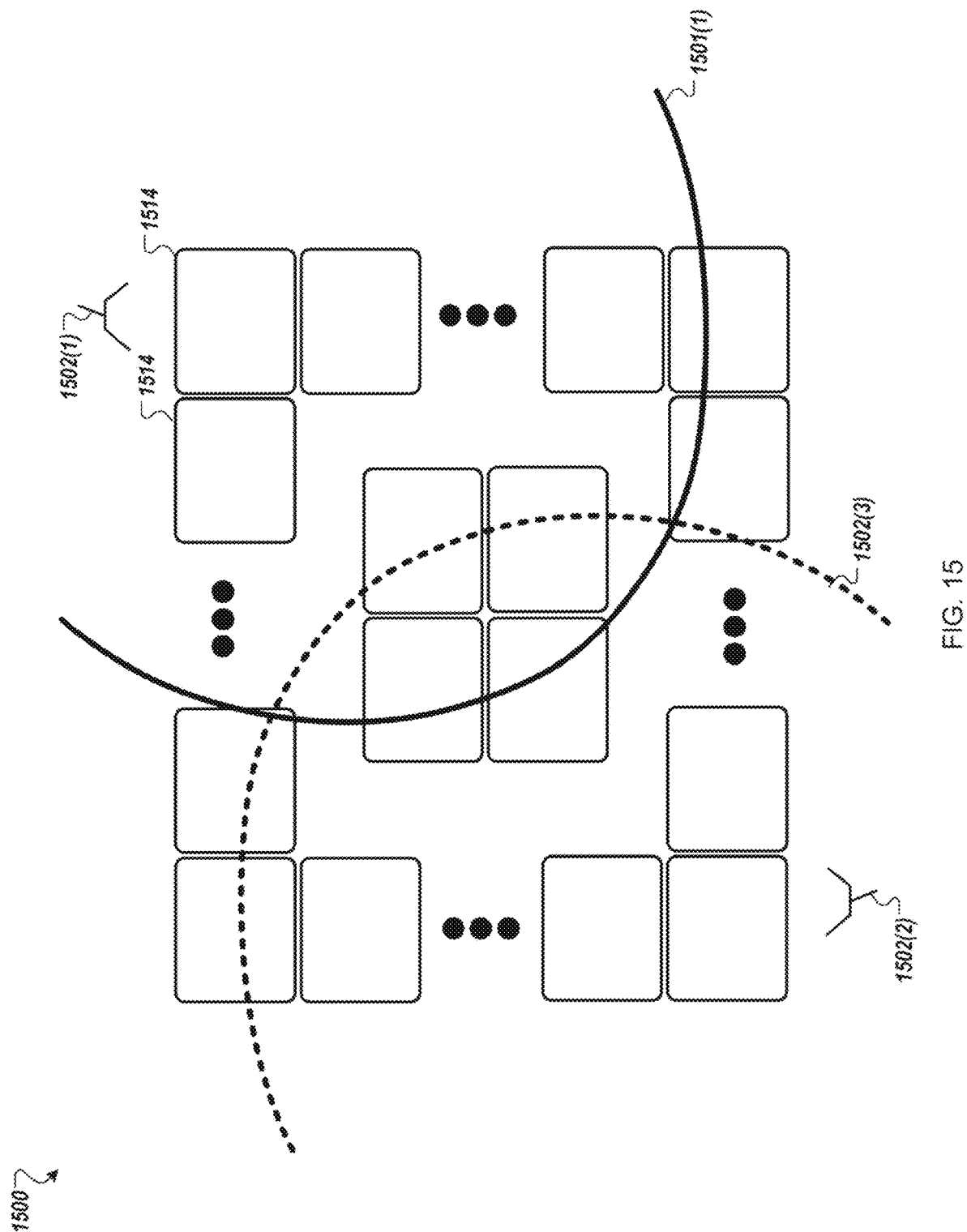
FIG. 15 illustrates an array antenna of a communication system with a first directional antenna and a second directional antenna placed at a periphery of an array antenna with overlapping coupling ranges according to one embodiment.

FIG. 15 illustrates an array antenna 1500 of a communication system with a first directional antennas 1502(1) and a second directional antenna 1502(2) placed at a periphery of an array antenna 1500 with overlapping coupling ranges according to one embodiment. Although not all components of the array antenna 1500 are shown, the array antenna 1500 is similar to the array antenna 100 of FIG. 1 as noted by similar reference numbers. The array antenna 1500 is constructed of modules 1514, similar to the array antenna 1400 of FIG. 14. Although in FIG. 14, the modules 1414 include one hundred antenna elements 1412, in other embodiments, the modules 1414 and/or the modules 1514 can have any integer number of antenna elements. It should be noted that the antenna elements are not shown on the modules 1514. It can be advantageous when each antenna element can be coupled to at least two directional antennas 1502 in order to ensure redundant data for more accurate in-orbit calibration. As described above, the first directional antenna 1502(1) is located at a first height above a plane of the array antenna 1500 and is pointed towards the array antenna 1500. The second directional antenna 1502(2) is located at a second height above the plane of the array antenna 1500 and is point towards the array antenna 1500. In some embodiments, the second height is the same as the first height, while in other embodiments, the second height can be different from the first height. However, the first height and the second height are such that the first directional antenna 1502(1) and the second directional antenna 1502(2) are within a near-field region of the array antenna 1500. In some cases, the array antenna 1500 is within a near-field region of the first directional antenna 1502(1) and the second directional antenna 1502(2). In some cases, some of the antenna elements are within a near field of the first directional antenna 1502(1) and others of the antenna elements are within a far field of the first directional antenna 1502(1), depending on a size of the array antenna 1500. It should also be noted that near field and far fields can be with respect to individual antenna elements of array antenna 1500 or the array antenna 1500 itself. The first directional antenna 1502(1) has a first coupling range, defined by a first region 1501(1). The first region 1501(1) includes a first set of antenna elements that can be coupled to the first directional antenna 1502(1). The first coupling range corresponds to a maximum distance at which the first directional antenna 1502(1) communicatively couples to an antenna element with a minimum coupling value. The second region 1501(2) includes a second set of antenna elements that can be coupled to the second directional antenna 1502(2). For example, the first directional antenna 1501(1) is located on the first edge and the first coupling range corresponds to a distance between the first directional antenna 1501(1) and the antenna element. In some cases, the antenna element is an antenna element that is located the furthest from the directional antenna 1501(1). The second coupling range corresponds to a maximum distance at which the second directional antenna 1502(2) communicatively couples to an antenna element with a minimum coupling value. At least some of the antenna elements are in both the first region corresponding to the coupling range of the first directional antenna 1501(1) and the second region corresponding to the coupling range of the second directional antenna 1501(2), meaning that they are within the both the first coupling range and the second coupling range. In other words, the at least some of the antenna elements can be coupled to both the first directional antenna 1502(1) and the second directional antenna 1502(2). It should be noted that the minimum coupling value corresponds to a coupling value below which a SNR between a directional antenna and an antenna element is sufficiently small that a signal cannot be measured. As an illustrative example, FIG. 13 illustrates minimum coupling values when a directional antenna is placed at an approximately far distance from the array antenna.

In some embodiments, the first coupling range is similar to the second coupling range (e.g., the first coupling range and the second coupling range include the same number of antenna elements). This occurs when the first directional antenna 1502(1) and the second directional antenna 1502(2) are identical and the second height is equal to the first height. In other embodiments, the first coupling range is dissimilar to the second coupling range (e.g., the first coupling range and the second coupling range include different numbers of antenna elements). This can occur when the first directional antenna 1502(1) and the second directional antenna 1502(2) are identical but the second height is different from the first height, when the first directional antenna 1502(1) and the second directional antenna 1502(2) are not identical, or a combination thereof. In some embodiments, the first coupling range and the second coupling range can be changed (e.g., varied or adjusted) by a gain control range of a transceiver.

Figure 16:
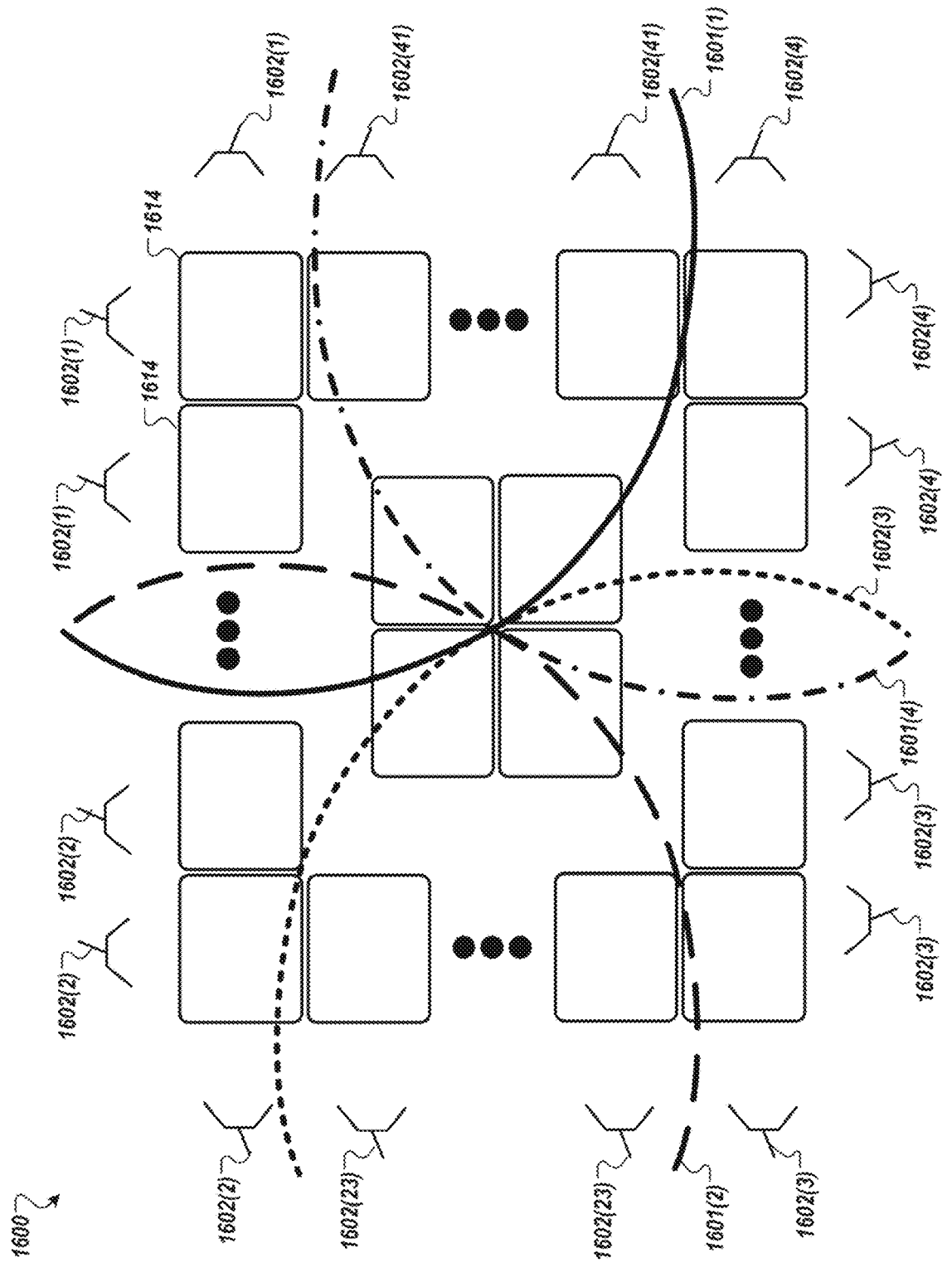
FIG. 16 illustrates an array antenna of a communication system with a number of directional antennas placed around a periphery of an array antenna with overlapping coupling ranges according to one embodiment.

FIG. 16 illustrates an array antenna 1600 of a communication system with a number of directional antennas 1602 placed around a periphery of an array antenna 1600 with overlapping coupling ranges according to one embodiment. Although not all components of the array antenna 1600 are shown, the array antenna 1600 is similar to the array antenna 100 of FIG. 1 as noted by similar reference numbers. The array antenna 1600 is constructed of modules 1614, similar to the array antenna 1400 of FIG. 14. Although in FIG. 14, the modules 1414 include one hundred antenna elements 1412, in other embodiments, the modules 1414 and/or the modules 1614 can have any integer number of antenna elements. It should be noted that the antenna elements are not shown on the modules 1614. It can be advantageous when each antenna element can be coupled to at least two directional antennas 1602 in order to ensure redundant data for more accurate in-orbit calibration.

In one embodiment, the communication system includes a first set of directional antennas that includes at least one directional antenna 1602(1) and/or 1602(41), a second set of directional antennas that includes at least one directional antenna 1602(2) and/or 1602(23), a third set of directional antennas that includes at least one direction antenna 1602(3) and/or 1602(23), and a fourth set of directional antennas that includes at least one directional antenna 1602(4) and/or 1602(41). Some directional antennas, such as directional antennas 1602(23) and 1602(41), can belong to more than one of the first set, the second set, the third set, and the fourth set. In other words, the sets of directional antennas do not need to be mutually exclusive. Each set of directional antennas has a coupling range, which includes the antenna elements which can be coupled to one or more directional antennas 1602 of the corresponding set of directional antennas, and the corresponding region can be defined and referred to as a "quadrant." For example, a first quadrant 1601(1) has a first coupling range (e.g., includes a first set of antenna elements that can be coupled to one or more directional antennas 1602 of the first set of directional antennas), a second quadrant 1601(2) has a second coupling range (e.g., includes a second set of antenna elements that can be coupled to one or more directional antennas 1602 of the second set of directional antennas), a third quadrant 1601(3) has a third coupling range (e.g., includes a third set of antenna elements that can be coupled to one or more directional antennas 1602 of the third set of directional antennas), and a fourth quadrant 1601(4) has a fourth coupling range (e.g., includes a fourth set of antenna elements that can be coupled to one or more directional antennas 1602 of the fourth set of directional antennas).

The first coupling range corresponds to a maximum distance at which the first set of antenna elements can communicatively couple to an antenna element with a first minimum coupling value. The second coupling range corresponds to a maximum distance at which the second set of antenna elements can communicatively couple to an antenna element with a second minimum coupling value. The third coupling range corresponds to a maximum distance at which the third set of antenna elements can communicatively couple to an antenna element with a third minimum coupling value. The fourth coupling range corresponds to a maximum distance at which the fourth set of antenna elements can communicatively couple to an antenna element with a fourth minimum coupling value.

The first quadrant 1601(1) overlaps with the second quadrant 1601(2) and the fourth quadrant 1601(4). The second quadrant 1601(2) overlaps with the first quadrant 1601(1) and the third quadrant 1601(3). The third quadrant 1601(3) overlaps with the second quadrant 1601(2) and the fourth quadrant 1601(4). The fourth quadrant 1601(4) overlaps with the first quadrant 1601(1) and the third quadrant 1601(3). In other words, the first set of antenna elements, the second set of antenna elements, the third set of antenna elements, and the fourth set of antenna elements are not mutually exclusive, and some antenna elements can fall into more than one quadrant. Therefore at least some of the antenna elements are located within the first coupling range and the second coupling range, at least some of the antenna elements are located within the first coupling range and the second coupling range, at least some of the antenna elements are located within the second coupling range and the third coupling range, at least some of the antenna elements are located within the third coupling range and the fourth coupling range, and at least some of the antenna elements are located within the first coupling range and the fourth coupling range, as depicted in FIG. 16. Thus each antenna element is located within at least two of the first coupling range, the second coupling range, the third coupling range, and the fourth coupling range. In some embodiments, each antenna element or some of the antenna elements can be located within three or four of the first coupling range, the second coupling range, the third coupling range, and the fourth coupling range.

In some embodiments, the directional antennas 1602 can be placed on a periphery of the array antenna 1600 such that each antenna element of the array antenna 1600 can be coupled to more than one directional antenna 1602. In some embodiments, the number of directional antennas can be selected such that each antenna element can be coupled to more than one directional antenna.

In another embodiment, the array antenna 1600 includes a first antenna element and a second antenna element. A third antenna element, a fourth antenna element, and a fifth antenna element are directional antennas located at a periphery of the array antenna 1600. The third antenna element has a first coupling range corresponding to a maximum distance at which the third antenna element communicatively couples to an antenna element with a first minimum coupling value. The fourth antenna element has a second coupling range corresponding to a maximum distance at which the fourth antenna element communicatively couples to an antenna element with a second minimum coupling value. The fifth antenna element has a third coupling range corresponding to a maximum distance at which the fifth antenna element communicatively couples to an antenna element with a third minimum coupling value. The first antenna element is located within the first coupling range and the second coupling range. The second antenna element is located within the first coupling range and the third coupling range. Thus, the first coupling range includes both the first antenna element and the second antenna element, while the second coupling range includes just the first antenna element and the third coupling range includes just the second antenna element.

In some embodiments, each of the array antennas described herein (such as the array antenna 100 of FIG. 1, the array antenna 200 of FIG. 2, the array antenna 300 of FIG. 3, the array antenna 700 of FIG. 7, the array antenna 1100 of FIG. 11, the array antenna 1400 of FIG. 14, the array antenna 1500 of FIG. 15, and the array antenna 1600 of FIG. 16) is a phased array antenna and is part of a satellite, and a directional antenna is configured to operate as a calibration antenna for in-orbit calibration of the phased array antenna.

Figure 17:
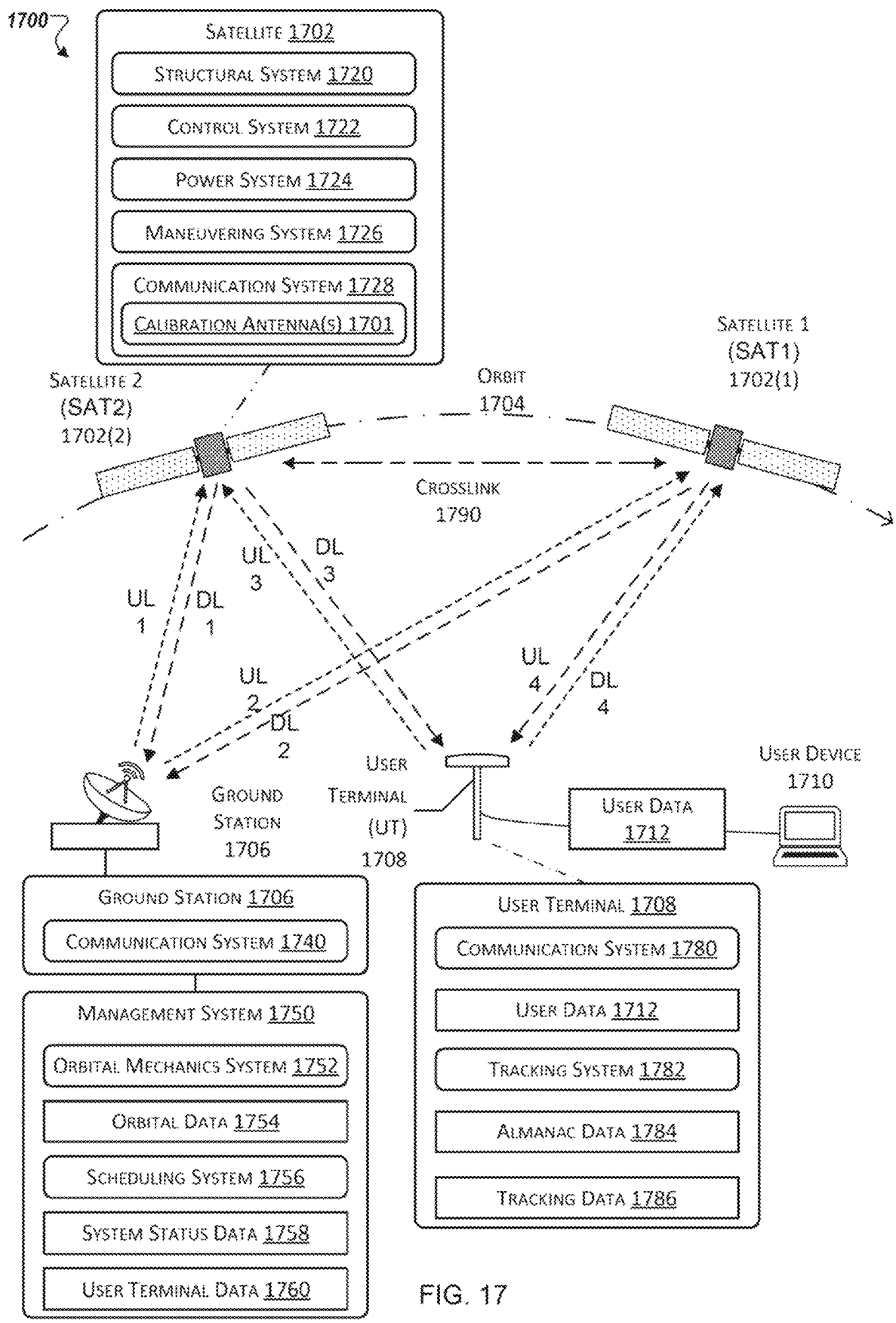
FIG. 17 illustrates a portion of a communication system that includes a constellation of satellites according to one embodiment.

FIG. 17 illustrates 1700 a portion of a communication system 1700 that includes a constellation of satellites 1702(1), 1702(2), . . . , 1702(S) according to one embodiment. The system 1700 shown here comprises a plurality (or "constellation") of satellites 1702(1), 1702(2), . . . , 1702(S), each satellite 1702 being in orbit 1704. Also shown is a ground station 1706, user terminal (UTs) 1708, and a user device 1710.

The constellation may comprise hundreds or thousands of satellites 1702, in various orbits 1704. For example, one or more of these satellites 1702 may be in non-geosynchronous orbits (NGOs) in which they are in constant motion with respect to the Earth. For example, the orbit 1704 is a low earth orbit (LEO). In this illustration, orbit 1704 is depicted with an arc pointed to the right. A first satellite (SAT1) 1702(1) is leading (ahead of) a second satellite (SAT2) 1702(2) in the orbit 1704. The satellite 1702 is discussed in more detail with regard to FIG. 18.

One or more ground stations 1706 are in communication with one or more satellites 1702. The ground stations 1706 may pass data between the satellites 1702, a management system 1750, networks such as the Internet, and so forth. The ground stations 1706 may be emplaced on land, on vehicles, at sea, and so forth. Each ground station 1706 may comprise a communication system 1740. Each ground station 1706 may use the communication system 1740 to establish communication with one or more satellites 1702, other ground stations 1706, and so forth. The ground station 1706 may also be connected to one or more communication networks. For example, the ground station 1706 may connect to a terrestrial fiber optic communication network. The ground station 1706 may act as a network gateway, passing user data 1712 or other data between the one or more communication networks and the satellites 1702. Such data may be processed by the ground station 1706 and communicated via the communication system 1740. The communication system 1740 of a ground station may include components similar to those of the communication system 1728 of a satellite 1702 and may perform similar communication functionalities. For example, the communication system 1728 of a satellite 1702 includes one or more calibration antennas 1701 (including the directional antennas 102 of FIG. 1, the directional antenna 202 of FIG. 2, the directional antenna 302 of FIG. 3, the directional antenna 702 of FIG. 7, the directional antenna 1102 of FIG. 11, the directional antennas 1402 of FIG. 14, the directional antennas 1502 of FIG. 15, and the directional antennas 1602 of FIG. 16). Further, the communication system 1740 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1706 are in communication with a management system 1750. The management system 1750 is also in communication, via the ground stations 1706, with the satellites 1702 and the UTs 1708. The management system 1750 coordinates operation of the satellites 1702, ground stations 1706, UTs 1708, and other resources of the system 1700. The management system 1750 may comprise one or more of an orbital mechanics system 1752 or a scheduling system 1756.

The orbital mechanics system 1752 determines orbital data 1754 that is indicative of a state of a particular satellite 1702 at a specified time. In one implementation, the orbital mechanics system 1752 may use orbital elements that represent characteristics of the orbit 1704 of the satellites 1702 in the constellation to determine the orbital data 1754 that predicts location, velocity, and so forth of particular satellites 1702 at particular times or time intervals. For example, the orbital mechanics system 1752 may use data obtained from actual observations from tracking stations, data from the satellites 1702, scheduled maneuvers, and so forth to determine the orbital elements. The orbital mechanics system 1752 may also consider other data, such as space weather, collision mitigation, orbital elements of known debris, and so forth.

The scheduling system 1756 schedules resources to provide communication to the UTs 1708. For example, the scheduling system 1756 may determine handover data that indicates when communication is to be transferred from the first satellite 1702(1) to the second satellite 1702(2). Continuing the example, the scheduling system 1756 may also specify communication parameters such as frequency, timeslot, and so forth. During operation, the scheduling system 1756 may use information such as the orbital data 1754, system status data 1758, user terminal data 1760, and so forth.

The system status data 1758 may comprise information such as which UTs 1708 are currently transferring data, satellite availability, current satellites 1702 in use by respective UTs 1708, capacity available at particular ground stations 1706, and so forth. For example, the satellite availability may comprise information indicative of satellites 1702 that are available to provide communication service or those satellites 1702 that are unavailable for communication service. Continuing the example, a satellite 1702 may be unavailable due to malfunction, previous tasking, maneuvering, and so forth. The system status data 1758 may be indicative of past status, predictions of future status, and so forth. For example, the system status data 1758 may include information such as projected data traffic for a specified interval of time based on previous transfers of user data 1712. In another example, the system status data 1758 may be indicative of future status, such as a satellite 1702 being unavailable to provide communication service due to scheduled maneuvering, scheduled maintenance, scheduled decommissioning, and so forth.

The user terminal data 1760 may comprise information such a location of a particular UT 1708. The user terminal data 1760 may also include other information such as a priority assigned to user data 1712 associated with that UT 1708, information about the communication capabilities of that particular UT 1708, and so forth. For example, a particular UT 1708 in use by a business may be assigned a higher priority relative to a UT 1708 operated in a residential setting. Over time, different versions of UTs 1708 may be deployed, having different communication capabilities such as being able to operate at particular frequencies, supporting different signal encoding schemes, having different antenna configurations, and so forth.

The UT 1708 includes a communication system 1780 to establish communication with one or more satellites 1702. The communication system 1780 of the UT 1708 may include components similar to those of the communication system 1728 or the communication system 1812 of a satellite 1702 and may perform similar communication functionalities. For example, the communication system 1780 may include one or more modems, digital signal processors, power amplifiers, antennas (including at least one antenna that implements multiple antenna elements, such as a phased array antenna), processors, memories, storage devices, communications peripherals, interface buses, and so forth. The UT 1708 passes user data 1712 between the constellation of satellites 1702 and the user device 1710. The user data 1712 includes data originated by the user device 1710 or addressed to the user device 1710. The UT 1708 may be fixed or in motion. For example, the UT 1708 may be used at a residence, or on a vehicle such as a car, boat, aerostat, drone, airplane, and so forth.

The UT 1708 includes a tracking system 1782. The tracking system 1782 uses almanac data 1784 to determine tracking data 1786. The almanac data 1784 provides information indicative of orbital elements of the orbit 1704 of one or more satellites 1702. For example, the almanac data 1784 may comprise orbital elements such as "two-line element" data for the satellites 1702 in the constellation that are broadcast or otherwise sent to the UTs 1708 using the communication system 1780.

The tracking system 1782 may use the current location of the UT 1708 and the almanac data 1784 to determine the tracking data 1786 for the satellite 1702. For example, based on the current location of the UT 1708 and the predicted position and movement of the satellites 1702, the tracking system 1782 is able to calculate the tracking data 1786. The tracking data 1786 may include information indicative of azimuth, elevation, distance to the second satellite, time of flight correction, or other information at a specified time. The determination of the tracking data 1786 may be ongoing. For example, the first UT 1708 may determine tracking data 1786 every 1700 ms, every second, every five seconds, or at other intervals.

With regard to FIG. 17, an uplink is a communication link which allows data to be sent to a satellite 1702 from a ground station 1706, UT 1708, or device other than another satellite 1702. Uplinks are designated as UL1, UL2, UL3 and so forth. For example, UL1 is a first uplink from the ground station 1706 to the second satellite 1702(2). In comparison, a downlink is a communication link which allows data to be sent from the satellite 1702 to a ground station 1706, UT 1708, or device other than another satellite 1702. For example, DL1 is a first downlink from the second satellite 1702(2) to the ground station 1706. The satellites 1702 may also be in communication with one another. For example, an intersatellite link 1790 provides for communication between satellites 1702 in the constellation.

The satellite 1702, the ground station 1706, the user terminal 1708, the user device 1710, the management system 1750, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 18:
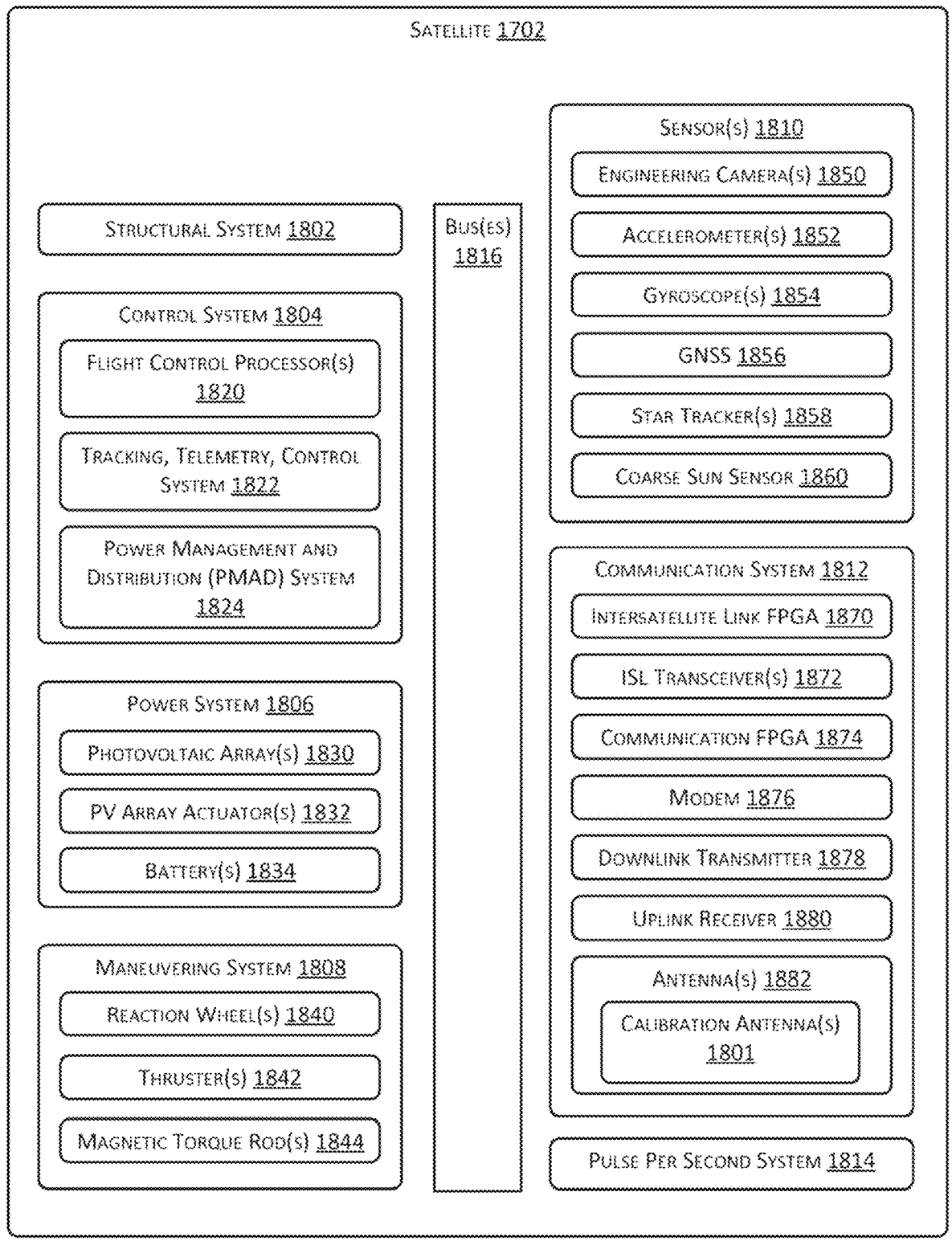
FIG. 18 is a functional block diagram of some systems associated with the satellite, according to some implementations.

FIG. 18 is a functional block diagram of some systems associated with the satellite 1702, according to some implementations. The satellite 1702 may comprise a structural system 1802, a control system 1804, a power system 1806, a maneuvering system 1808, one or more sensors 1810, and a communication system 1812. A pulse per second (PPS) system 1814 may be used to provide timing reference to the systems onboard the satellite 1702. One or more busses 1816 may be used to transfer data between the systems onboard the satellite 1702. In some implementations, redundant busses 1816 may be provided. The busses 1816 may include, but are not limited to, data busses such as Controller Area Network Flexible Data Rate (CAN FD), Ethernet, Serial Peripheral Interface (SPI), and so forth. In some implementations the busses 1816 may carry other signals. For example, a radio frequency bus may comprise coaxial cable, waveguides, and so forth to transfer radio signals from one part of the satellite 1702 to another. In other implementations, some systems may be omitted or other systems added. One or more of these systems may be communicatively coupled with one another in various combinations.

The structural system 1802 comprises one or more structural elements to support operation of the satellite 1702. For example, the structural system 1802 may include trusses, struts, panels, and so forth. The components of other systems may be affixed to, or housed by, the structural system 1802. For example, the structural system 1802 may provide mechanical mounting and support for solar panels in the power system 1806. The structural system 1802 may also provide for thermal control to maintain components of the satellite 1702 within operational temperature ranges. For example, the structural system 1802 may include louvers, heat sinks, radiators, and so forth.

The control system 1804 provides various services, such as operating the onboard systems, resource management, providing telemetry, processing commands, and so forth. For example, the control system 1804 may direct operation of the communication system 1812. The control system 1804 may include one or more flight control processors 1820. The flight control processors 1820 may comprise one or more processors, FPGAs, and so forth. A tracking, telemetry, and control (TTC) system 1822 may include one or more processors, radios, and so forth. For example, the TTC system 1822 may comprise a dedicated radio transmitter and receiver to receive commands from a ground station 1706, send telemetry to the ground station 1706, and so forth. A power management and distribution (PMAD) system 1824 may direct operation of the power system 1806, control distribution of power to the systems of the satellite 1702, control battery 1834 charging, and so forth.

The power system 1806 provides electrical power for operation of the components onboard the satellite 1702. The power system 1806 may include components to generate electrical energy. For example, the power system 1806 may comprise one or more photovoltaic arrays 1830 comprising a plurality of photovoltaic cells, thermoelectric devices, fuel cells, and so forth. One or more PV array actuators 1832 may be used to change the orientation of the photovoltaic array(s) 1830 relative to the satellite 1702. For example, the PV array actuator 1832 may comprise a motor. The power system 1806 may include components to store electrical energy. For example, the power system 1806 may comprise one or more batteries 1834, fuel cells, and so forth.

The maneuvering system 1808 maintains the satellite 1702 in one or more of a specified orientation or orbit 1704. For example, the maneuvering system 1808 may stabilize the satellite 1702 with respect to one or more axes. In another example, the maneuvering system 1808 may move the satellite 1702 to a specified orbit 1704. The maneuvering system 1808 may include one or more of reaction wheel(s) 1840, thrusters 1842, magnetic torque rods 1844, solar sails, drag devices, and so forth. The thrusters 1842 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 1806 to expel the water and produce thrust. During operation, the maneuvering system 1808 may use data obtained from one or more of the sensors 1810.

The satellite 1702 includes one or more sensors 1810. The sensors 1810 may include one or more engineering cameras 1850. For example, an engineering camera 1850 may be mounted on the satellite 1702 to provide images of at least a portion of the photovoltaic array 1830. Accelerometers 1852 provide information about acceleration of the satellite 1702 along one or more axes. Gyroscopes 1854 provide information about rotation of the satellite 1702 with respect to one or more axes. The sensors 1810 may include a global navigation satellite system (GNSS) 1856 receiver, such as Global Positioning System (GPS) receiver, to provide information about the position of the satellite 1702 relative to Earth. In some implementations the GNSS 1856 may also provide information indicative of velocity, orientation, and so forth. One or more star trackers 1858 may be used to determine an orientation of the satellite 1702. A coarse sun sensor 1860 may be used to detect the sun, provide information on the relative position of the sun with respect to the satellite 1702, and so forth. The satellite 1702 may include other sensors 1810 as well. For example, the satellite 1702 may include a horizon detector, radar, light detection and ranging (lidar), and so forth.

The communication system 1812 provides communication with one or more other devices, such as other satellites 1702, ground stations 1706, user terminals 1708, and so forth. The communication system 1812 may include one or more modems 1876, digital signal processors, power amplifiers, antennas 1882 (including at least one antenna that implements multiple antenna elements, such as a phased array antenna and at least one directional calibration antenna 1801 such as the directional antennas 102 of FIG. 1, the directional antenna 202 of FIG. 2, the directional antenna 302 of FIG. 3, the directional antenna 702 of FIG. 7, the directional antenna 1102 of FIG. 11, the directional antennas 1402 of FIG. 14, the directional antennas 1502 of FIG. 15, and the directional antennas 1602 of FIG. 16), processors, memories, storage devices, communications peripherals, interface buses, and so forth. Such components support communications with other satellites 1702, ground stations 1706, user terminals 1708, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1812 may be output to other systems, such as to the control system 1804, for further processing. Output from a system, such as the control system 1804, may be provided to the communication system 1812 for transmission.

The communication system 1812 may include hardware to support the intersatellite link 1790. For example, an intersatellite link FPGA 1870 may be used to modulate data that is sent and received by an ISL transceiver 1872 to send data between satellites 1702. The ISL transceiver 1872 may operate using radio frequencies, optical frequencies, and so forth.

A communication FPGA 1874 may be used to facilitate communication between the satellite 1702 and the ground stations 1706, UTs 1708, and so forth. For example, the communication FPGA 1874 may direct operation of a modem 1876 to modulate signals sent using a downlink transmitter 1878 and demodulate signals received using an uplink receiver 1880. The satellite 1702 may include one or more antennas 1882, which includes one or more directional calibration antennas 1801 (such as the directional antennas 102 of FIG. 1, the directional antenna 202 of FIG. 2, the directional antenna 302 of FIG. 3, the directional antenna 702 of FIG. 7, the directional antenna 1102 of FIG. 11, the directional antennas 1402 of FIG. 14, the directional antennas 1502 of FIG. 15, and the directional antennas 1602 of FIG. 16). For example, one or more parabolic antennas may be used to provide communication between the satellite 1702 and one or more ground stations 1706. In another example, a phased array antenna may be used to provide communication between the satellite 1702 and the UTs 1708.

Figure 19:
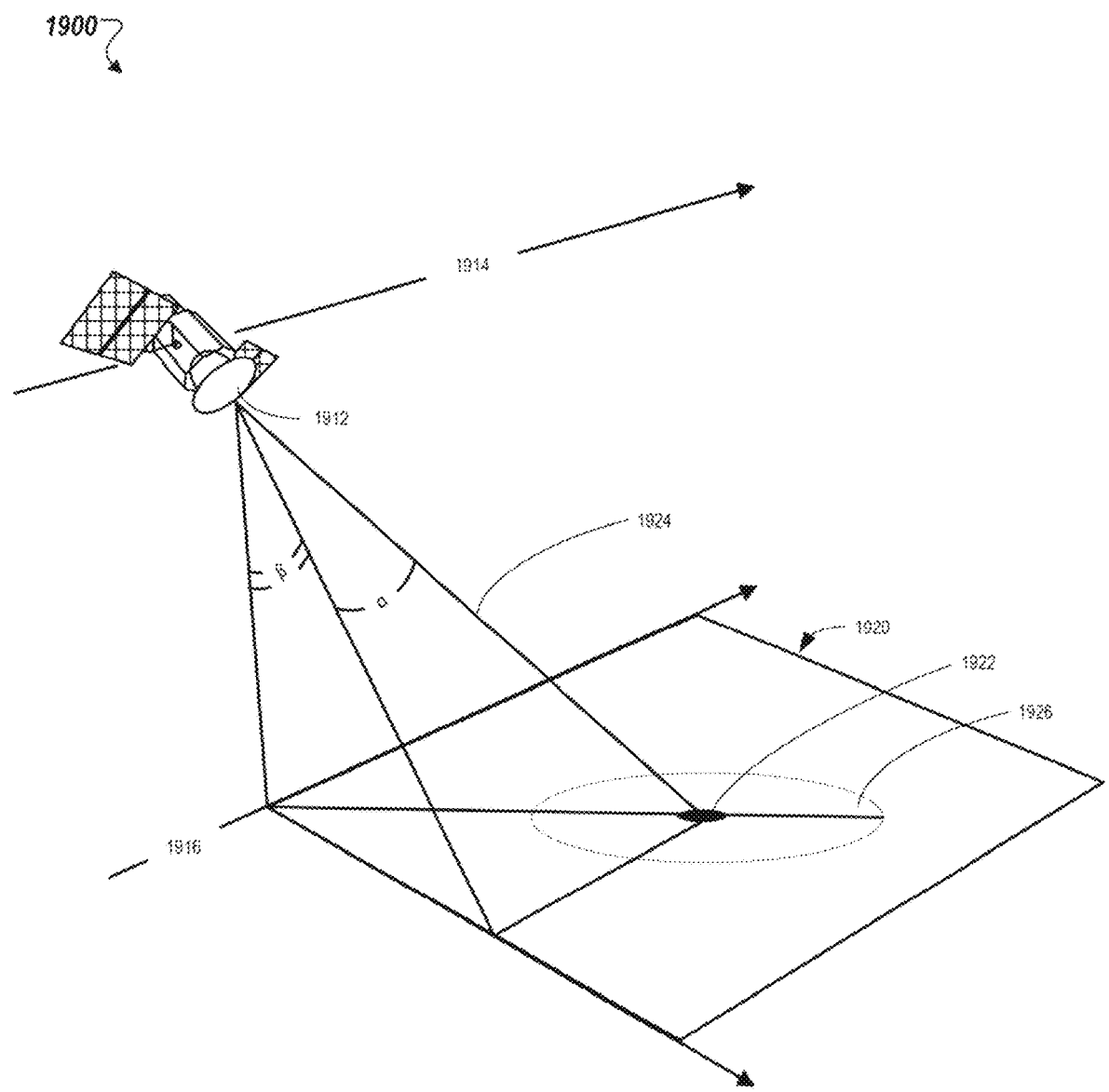
FIG. 19 illustrates the satellite including an antenna system that is steerable according to one embodiment.

FIG. 19 illustrates the satellite 1900 including an antenna system 1912 that is steerable according to one embodiment. The satellite 1900 is an example of a satellite 1702 of FIG. 17. The antenna system 1912 may include multiple antenna elements that form an antenna and that can be mechanically or electrically steered individually, collectively, or a combination thereof. In an example, the antenna is a phased array antenna. The antenna system 1912 can also include one or more directional calibration antennas, such as the directional antennas 102 of FIG. 1, the directional antenna 202 of FIG. 2, the directional antenna 302 of FIG. 3, the directional antenna 702 of FIG. 7, the directional antenna 1102 of FIG. 11, the directional antennas 1402 of FIG. 14, the directional antennas 1502 of FIG. 15, and the directional antennas 1602 of FIG. 16.

In orbit 1704, the satellite 1900 follows a path 1914, the projection of which onto the surface of the Earth forms a ground path 1916. In the example illustrated in FIG. 19, the ground path 1916 and a projected axis extending orthogonally from the ground path 1916 at the position of the satellite 1900, together define a region 1920 of the surface of the Earth. In this example, the satellite 1900 is capable of establishing uplink and downlink communications with one or more of ground stations, user terminals, or other devices within the region 1920, including a ground station 1706 and a user terminal 1708 of FIG. 17. In some embodiments, the region 1920 may be located in a different relative position to the ground path 1916 and the position of the satellite 1900. For example, the region 1920 may describe a region of the surface of the Earth directly below the satellite 1900. Furthermore, embodiments may include communications between the satellite 1900, an airborne communications system, and so forth.

As shown in FIG. 19, a communication target 1922 (e.g., a ground station or a user terminal) is located within the region 1920. The satellite 1900 controls the antenna system 1912 to steer transmission and reception of communications signals to selectively communicate with the communication target 1922. For example, in a downlink transmission from the satellite 1900 to the communication target 1922, a signal beam 1924 emitted by the antenna system 1912 is steerable within an area 1926 of the region 1920. In some implementations, the signal beam 1924 may comprise a plurality of subbeams. The extents of the area 1926 define an angular range within which the signal beam 1924 is steerable, where the direction of the signal beam 1924 is described by a beam angle "α" relative to a surface normal vector of the antenna system 1912. In two-dimensional phased array antennas, the signal beam 1924 is steerable in two dimensions, described in FIG. 19 by a second angle "β" orthogonal to the beam angle α. In this way, the area 1926 is a two-dimensional area within the region 1920, rather than a linear track at a fixed angle determined by the orientation of the antenna system 1912 relative to the ground path 1916.

In FIG. 19, as the satellite 1900 follows the path 1914, the area 1926 tracks along the surface of the Earth. In this way, the communication target 1922, which is shown centered in the area 1926 for clarity, is within the angular range of the antenna system 1912 for a period of time. During that time, signals communicated between the satellite 1900 and the communication target 1922 are subject to bandwidth constraints, including but not limited to signal strength and calibration of the signal beam 1924. In an example, for phased array antenna systems, the signal beam 1924 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 20:
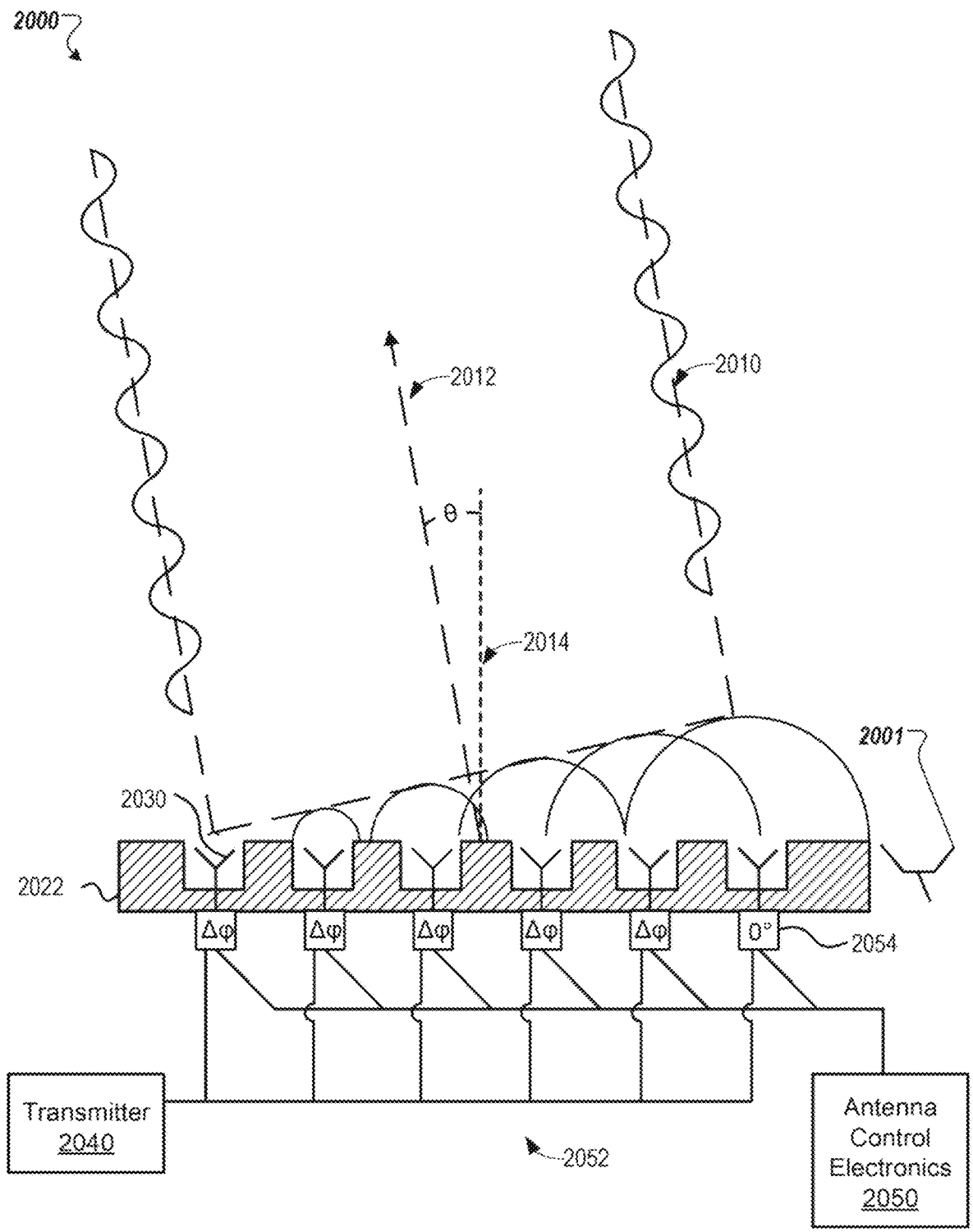
FIG. 20 illustrates a simplified schematic of an antenna, according to embodiments of the present disclosure.

FIG. 20 illustrates a simplified schematic of an antenna 2000, according to embodiments of the present disclosure.

The antenna 2000 may be a component of the antenna system 1912 of FIG. 19. As illustrated, the antenna 2000 is a phased array antenna that includes multiple antenna elements 2030. Interference between the antenna elements 2030 forms a directional radiation pattern in both transmitter and receiver arrays forming a beam 2010 (beam extents shown as dashed lines). The beam 2010 is a portion of a larger transmission pattern (not shown) that extends beyond the immediate vicinity of the antenna 2000. The beam 2010 is directed along a beam vector 2012, described by an angle "θ" relative to an axis 2014 normal to a surface of the antenna 2000. As described below, the beam 2010 is one or more of steerable or shapeable through control of operating parameters including, but not limited to a phase and an amplitude of each antenna element 2030.

In FIG. 20, the antenna 2000 includes, within a transmitter section 2022, the plurality of antenna elements 2030, which may include, but are not limited to, omnidirectional transmitter antennas coupled to a transmitter system 2040, such as the downlink transmitter 1878. The transmitter system 2040 provides a signal, such as a downlink signal to be transmitted to a ground station on the surface. The downlink signal is provided to each antenna element 2030 as a time-varying signal that may include several multiplexed signals. To steer the beam 2010 relative to the axis 2014, the phased array antenna system 2000 includes antenna control electronics 2050 controlling a radio frequency (RF) feeding network 2052, including a plurality of signal conditioning components 2054 interposed between the antenna elements 2030 and the transmitter system 2040. The signal conditioning components 2054 introduce one or more of a phase modulation or an amplitude modulation, as denoted by "Δφ" in FIG. 20, to the signal sent to the antenna elements 2030. As shown in FIG. 20, introducing a progressive phase modulation produces interference in the individual transmission of each antenna element 2030 that generates the beam 2010.

The antenna 2000 also includes one or more directional calibration antennas 2001 (such as the directional antennas 102 of FIG. 1, the directional antenna 202 of FIG. 2, the directional antenna 302 of FIG. 3, the directional antenna 702 of FIG. 7, the directional antenna 1102 of FIG. 11, the directional antennas 1402 of FIG. 14, the directional antennas 1502 of FIG. 15, and the directional antennas 1602 of FIG. 16) for periodic in-orbit calibration of the plurality of antenna elements 2030.

The phase modulation imposed on each antenna element 2030 will differ and will be dependent on a spatial location of a communication target that determines an optimum beam vector (e.g., where the beam vector 2012 is found by one or more of maximizing signal intensity or connection strength). The optimum beam vector may change with time as the communication target 1922 moves relative to the phased array antenna system 2000.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
    a first radio frequency (RF) module circuit;
    a first antenna element of an antenna array, the first antenna element being located in a first plane;
    a second antenna element of the antenna array, the second antenna element being located in the first plane and separated from the first antenna element by a first distance; and
    a third antenna element coupled to the first RF module circuit and located in a second plane that is located at a first height above the first plane, wherein the third antenna element is located at a periphery of an area of the antenna array, wherein the first height is located within a first distance from the first antenna element, and wherein the third antenna element comprises a directivity parameter in which the third antenna element radiates or receives electromagnetic energy with a highest power density in a direction between the third antenna element and the first plane.

2. The communication system of claim 1, further comprising a second RF module circuit coupled to the first antenna element and the second antenna element.

3. The communication system of claim 1, further comprising:
    a first support structure, wherein the first antenna element and the second antenna element are coupled to the first support structure; and
    a second support structure coupled to the first support structure at a first end of the second support structure, the first end being at the periphery of the area, wherein the third antenna element is located at a second end of the second support structure and pointed towards the first antenna element and the second antenna element.

4. The communication system of claim 3, further comprising:
    a third support structure coupled to the first support structure coupled to the first support structure at a first end of the third support structure, the first end of the third support structure being at the periphery of the area, and
    a fourth antenna element located at a second end of the third support structure, the fourth antenna element being located at the first height above the first plane and pointed at the first plane.

5. The communication system of claim 1, further comprising:
    a fourth antenna element located at the periphery of the area and in the second plane, the fourth antenna element being pointed towards the first plane, wherein:
        the third antenna element comprises a first coupling range;
        the fourth antenna element comprises a second coupling range; and
        the first antenna element is located within the first coupling range and the second coupling range.

6. The communication system of claim 1, wherein the third antenna element comprises a first coupling range corresponding to a distance between the third antenna element and the first antenna element at which the third antenna element can communicatively couples to the antenna element with a coupling value above a first threshold value.

7. The communication system of claim 6, further comprising a fourth antenna element and a fifth antenna element, wherein the first antenna element is located within the first coupling range and a second coupling range corresponding to a second distance at which the fourth antenna element communicatively couples to an antenna element with a coupling value above a second threshold value, and wherein the second antenna element is located within the first coupling range and a third coupling range corresponding to a third distance at which the fifth antenna element communicatively couples to an antenna element with a coupling value above a third threshold value.

8. The communication system of claim 1, wherein the third antenna element is a rectangular horn antenna or a conical horn antenna.

9. The communication system of claim 1, wherein:
the first antenna element and the second antenna element are part of a phased array antenna of a satellite; and
the third antenna element is configured to operate as a calibration antenna for in-orbit calibration of the phased array antenna.

10. A communication system comprising:
a first radio frequency (RF) module circuit;
a first antenna element of an antenna array, the first antenna element being located in an area in a first plane;
a second antenna element of the antenna array, the second antenna element being located in the area in the first plane and separated from the first antenna element by a first distance; and
a third antenna element coupled to the first RF module circuit and located in a second plane that is located at a first height above the first plane in a near field of the antenna array, wherein the third antenna element is located at a periphery of the area and pointed towards the antenna array, wherein the third antenna element comprises a directivity parameter in which the third antenna element radiates or receives electromagnetic energy with a highest power density in a direction between the third antenna element and the first plane.

11. The communication system of claim 10, further comprising:
a circuit board, wherein the first RF module circuit is located on a first side of the circuit board, wherein the first RF module circuit operates in a first frequency range, and wherein the first antenna element and the second antenna element are located on a second side of the circuit board;
a second RF module circuit located on the first side of the circuit board, wherein the second RF module circuit is coupled to the first antenna element and the second antenna element, wherein the second RF module circuit operates in the first frequency range; and
a first support structure coupled to the circuit board at a first end of the first support structure, the first end being at the periphery of the area, wherein the first antenna element is a first horn antenna coupled to the first RF module circuit, the first horn antenna being located at a second end of the first support structure, the first horn antenna being located at the first height above the first plane and pointed towards the antenna array.

12. The communication system of claim 11, further comprising:
a second support structure coupled to the circuit board at a first end of the second support structure, the first end of the second support structure being at the periphery of the area; and
a second horn antenna located at a second end of the second support structure, the second horn antenna being located at the first height above the first plane and pointed towards the antenna array, wherein the first horn antenna is located at a first distance from the first antenna element and the second horn antenna is located at a second distance from the first antenna element.

13. The communication system of claim 10, further comprising:
a first horn antenna located on a first edge of the area, wherein the first horn antenna is the third antenna element;
a second horn antenna located on a second edge of the area;
a third horn antenna located on a third edge of the area; and
a fourth horn antenna located on a fourth edge of the area, wherein the first antenna element and the second antenna element are located within a coupling range of at least two of the first horn antenna, the second horn antenna, the third horn antenna, and the fourth horn antenna.

14. A communication system comprising:
a first radio frequency (RF) module circuit;
a first antenna element of an antenna array, the first antenna element being located in an area in a first plane;
a second antenna element of the antenna array, the second antenna element being located in the area in the first plane and separated from the first antenna element by a first distance; and
a horn antenna coupled to the first RF module circuit and located in a second plane that is located at a first height above the first plane in a near field of the antenna array, wherein the horn antenna is located at a periphery of the area and pointed towards the antenna array, wherein the horn antenna comprises a directivity parameter in which the horn antenna radiates or receives electromagnetic energy with a highest power density in a direction between the horn antenna and the first plane.

15. The communication system of claim 14, further comprising:
a first support structure, wherein the first antenna element and the second antenna element are located in the area on a first side of the first support structure; and
a second support structure coupled to the first support structure at the periphery of the area, wherein the horn antenna is located at a distal end of the second support structure farther away from the first support structure.

16. The communication system of claim 14, further comprising:
a second directional antenna located at the first height above the first plane in the near field of the antenna array, wherein the second directional antenna is located at the periphery of the area and pointed towards the antenna array, wherein the second directional antenna comprises a directivity parameter in which the second directional antenna radiates or receives electromagnetic energy with a highest power density in a direction between the second directional antenna and the first plane.

17. The communication system of claim 16, wherein:
the horn antenna comprises a first coupling range;
the second directional antenna comprises a second coupling range; and
the first antenna element is located within at least one of the first coupling range or the second coupling range; and
the second antenna element is located within at least one of the first coupling range or the second coupling range.

18. The communication system of claim 14, wherein the horn antenna comprises a first coupling range corresponding to a first distance at which the horn antenna communicatively couples to at least one of the first antenna element or the second antenna element with a first coupling value.

19. The communication system of claim 14, wherein the first antenna element is a patch antenna.

20. The communication system of claim 14, wherein:
- the antenna array is a phased array antenna and is part of a satellite; and
- the horn antenna is configured to operate as a calibration antenna for in-orbit calibration of the phased array antenna.

* * * * *